United States Patent [19]

Howeth

[11] 4,434,861
[45] Mar. 6, 1984

[54] DUST CONVEYING AND COLLECTING SYSTEM AND METHOD

[76] Inventor: D. Franklin Howeth, 233 Chuck Wagon Trail, Fort Worth, Tex. 76108

[21] Appl. No.: 223,036

[22] Filed: Jan. 7, 1981

[51] Int. Cl.³ .................... E21B 21/06; E21C 7/02
[52] U.S. Cl. ................................ 175/66; 175/88; 175/206; 175/209; 175/214
[58] Field of Search ............ 175/206, 209, 210, 211, 175/212, 213, 214, 88, 66

[56] References Cited

U.S. PATENT DOCUMENTS

| 895,228 | 8/1908 | Bartlett | 175/206 |
|---|---|---|---|
| 2,107,552 | 2/1938 | Smith | 175/209 |
| 2,122,517 | 7/1938 | Curtis | 175/206 X |
| 2,144,586 | 1/1939 | Kelley | 175/209 |
| 2,279,186 | 4/1942 | Terry et al. | 175/209 X |
| 2,829,867 | 4/1958 | Brochetti | 175/209 |
| 4,223,748 | 9/1980 | Barendsen | 175/206 X |
| 4,332,301 | 6/1982 | Jonell | 175/206 X |

FOREIGN PATENT DOCUMENTS

| 2235356 | 2/1973 | Fed. Rep. of Germany | 175/209 |
|---|---|---|---|
| 2377519 | 9/1978 | France | 175/206 |
| 549240 | 10/1956 | Italy | 175/209 |

Primary Examiner—Stephen J. Novosad
Attorney, Agent, or Firm—Hubbard, Thurman, Turner & Tucker

[57] ABSTRACT

A conveying and collection system adapted for drilling rigs for conveying drill cuttings entrained with a bailing air flow stream emanating from the drillhole includes a generally tubular head fitted around the drillhole having a flow deflecting surface portion adapted to deflect the flow stream of drill cuttings into a conveying enclosure whereby velocity reduction and change of direction of the flow stream will separate relatively coarse cuttings. A mechanical conveyor may be disposed in the enclosure to convey the cuttings to a point remote from the drillhole. The head may be extended and retracted with respect to the drill rig deck plate by actuators controlled in accordance with the conduction of bailing air to the drill stem. One embodiment of the head comprises an enclosure formed by overlapping helical convolutions of a flat spirally coiled band. The head may be provided with retractable gate members remotely actuated to move clear of an opening in the head which is of sufficient size to permit movement of drill stem coupling members and/or the drill bit through the head during drilling operations. A filter unit has a plurality of separate filter element chambers in which are disposed porous media filter elements arranged side by side along the flow path of a bailing air flow stream entering the filter unit housing so that the lower velocity portions of the flow stream are diverted into the filter element chambers and forced to flow in a vortical manner to provide inertial separation prior to flow through the filter elements. A suction pump on the filter unit is operable to vary its inlet volumetric capacity to provide a partial vacuum condition throughout the collection system to minimize leakage flow of dust laden bailing air out of the system.

54 Claims, 14 Drawing Figures

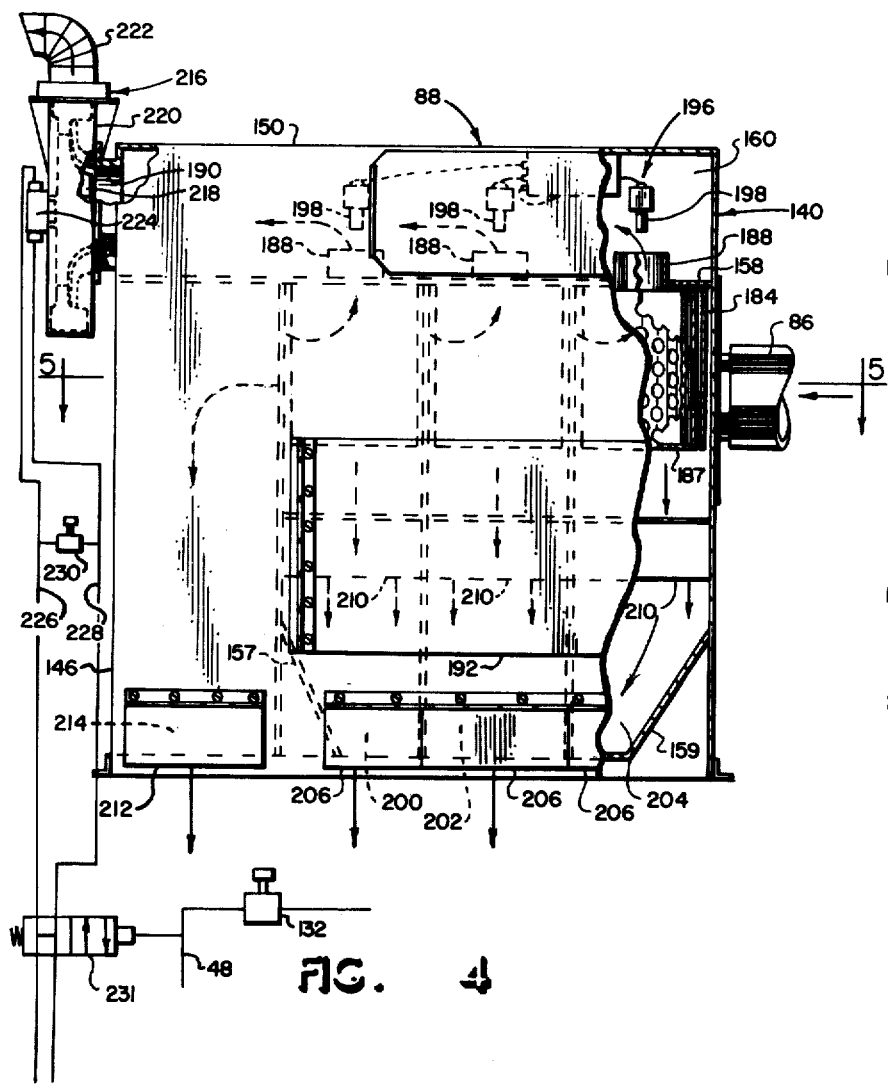
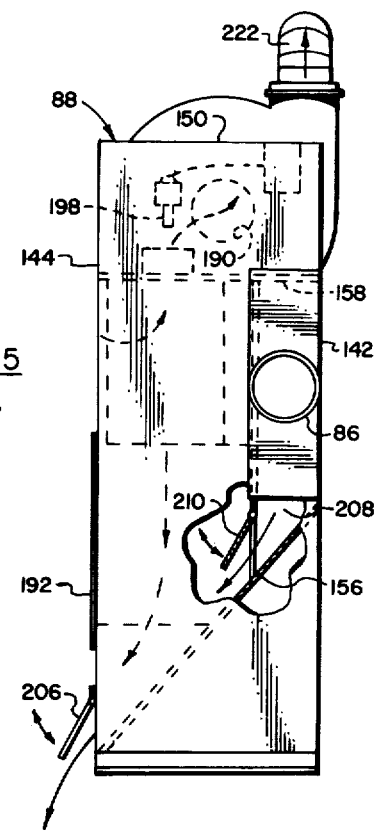
FIG. 4
FIG. 6
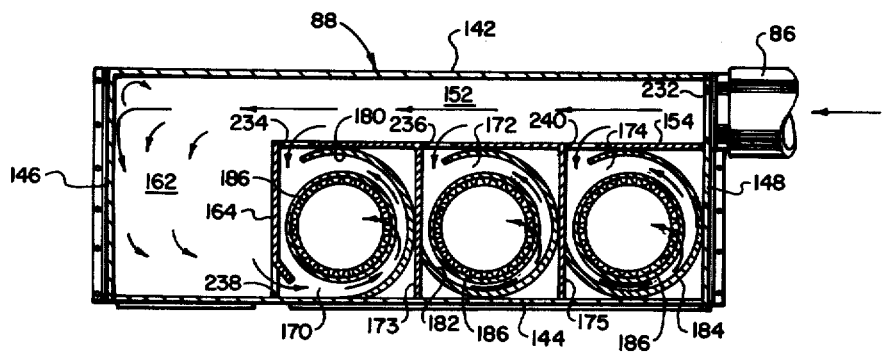
FIG. 5

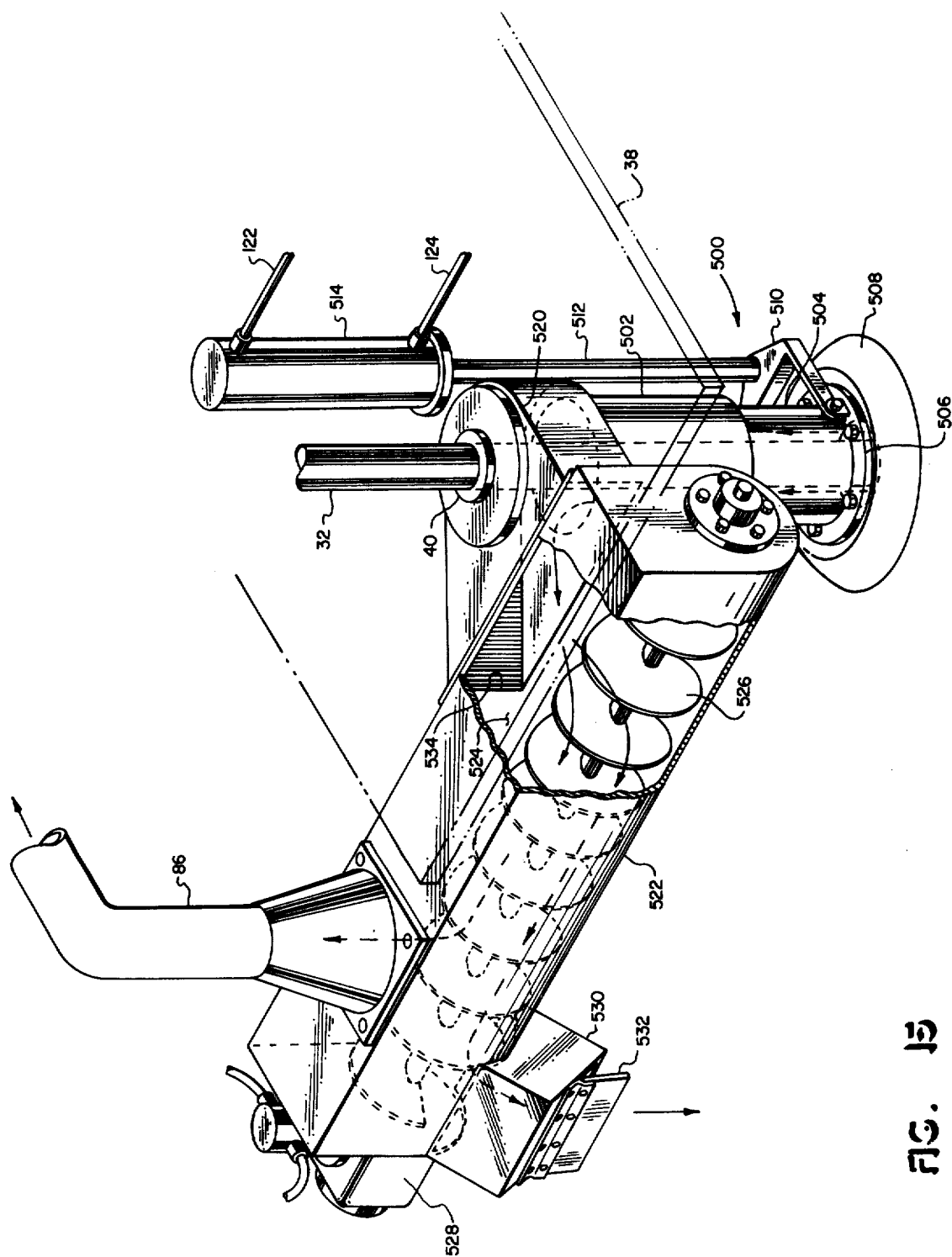

DUST CONVEYING AND COLLECTING SYSTEM AND METHOD

BACKGROUND OF THE INVENTION

1. Field of the Invention

The present invention pertains to an improved system for conveying and collecting airborne particulate matter and is particularly adapted to be used in conjunction with earth drilling equipment for handling both the fine and coarse drill cuttings discharged from the drill hole.

2. Background Art

The increasing need to control airborne dust and particulate matter from various sources has resulted in a demand for equipment which is capable of handling large volumes of air heavily laden with dust and debris ranging from particle sizes which are kept airborne only by relatively high velocity flow streams to particles having a nominal dimension less than 4 to 5 microns.

There are many applications where improvements in conveying and collecting airborne dust and debris have been desired but one of the most demanding situations has been managing the material removed from the drillhole in various earth drilling operations. A widely used technique in drilling blast holes as well as exploratory shot holes and wells of various kinds, where conditions permit, involves the removal of the material from the hole by a high velocity stream of pressure fluid such as compressed air. In conventional drilling practice wherein localized crushing of the earth and rock is accomplished by a bit disposed at the lower end of an elongated drill stem the material removed during the formation of the drillhole comprises particulate matter ranging in size from nominal dimensions of 10 millimeters down to fine dust particles of less than 5 to 10 microns. This material is removed from the hole by compressed air which is conducted down into the hole within the hollow drill stem and is ejected at the bottom of the hole through orifices in the drill bit. The compressed air is supplied in sufficient quantity from a compressor either on board the drilling rig or connected thereto to enable the drill cuttings and dust to be ejected from the hole through the annular flow area between the bore wall and the drill stem. The demand for ever increasing rates of penetration and hole size has, of course, increased the size of compression equipment required so that adequate volumes of air are supplied to remove the drill cuttings from the hole to facilitate the drilling process.

The continuous ejection of large flow rates of air heavily laden with particulate matter of the consistency described above has been a long standing problem in the art of earth drilling equipment. The problems associated with pollution and creation of health hazards from large quantities of airborne dust together with a desire to minimize contamination of the drilling equipment has resulted in numerous efforts to develop equipment to control the drill cuttings and dust ejected from the drill hole. Prior art methods of dust control and collection have generally involved the provision of an enclosure around the drillhole at the surface comprising a relatively large box-like hood having rigid side walls or flexible curtains which depend vertically to engage or be in close proximity to the ground. Usually, a filter unit comprising one or more impingement type filter elements is also mounted on the drilling rig and connected to the aforementioned enclosure by a suitable conduit. Most known types of filter units require a suction pump or "blower" disposed downstream of the impingement type filter elements to assist in conveying the flow stream of dust laden air through the complete filtering system.

One long standing problem with prior art systems has been related to the fact that the heavier drill cuttings on being ejected from the drill hole fall to the ground within the enclosure or hood due to the reduced velocity of the conveying air stream as it enters the enlarged volume of the hood. These heavier cuttings usually form a somewhat volcano shaped pile around the drillhole which presents a problem in itself in most types of drilling. For example, if the piles of drill cuttings are not removed from the drillhole upon completion of the drilling operation the material is often accidentally pushed back into the hole by the movement of the hood or the drilling rig as it is moved from one drilling site to another, by other pieces of equipment used in the area of drilling and from natural activity such as high winds and/or rain. Accordingly, there has been a long felt need for drill cuttings conveying and handling systems which will remove all of the cuttings and dust from the immediate vicinity of the drillhole. This has become increasingly important in certain operations where the economic value of the cuttings is sufficient to warrant substantial reclamation of the cuttings and where drillholes are being formed for analysis of the cuttings themselves.

Not only has it become important to remove substantially all of the drill cuttings from the immediate vicinity of the drillhole but the desire to minimize airborne dust in the vicinity of drilling equipment, and for that matter any particular environment, has resulted in new demands for improvements in dust control and collection equipment. Prior art dust collecting hoods, particularly those involving loosely hanging flexible skirts or curtains, have proven to be generally inadequate to suitably contain and control fine dust being ejected from the drillhole. Even filter systems with suction pumps or blowers capable of handling an inlet air flow rate of between two and three times the volume flow rate of air being conducted down the drill stem have proven to be inadequate to control the escape of substantial quantities of dust laden air from around the drillhole.

Accordingly, the desire and need to provide for a total conveying and collection system for the entire range of particle size comprising the cuttings and "dust" generated in earth drilling operations has resulted in the development of a type of system in which so called make up air is provided at or near the point of ejection of the cutting flow stream from the drillhole. These relatively new systems are characterized by very high power requirements necessitated by suction fans or blowers which are required to handle an inlet flow capacity of as much as four to six times the nominal volumetric flow rate of air being conducted down the drill stem in order to assure that the heavier cuttings as well as the fine dust particles are conducted away from the vicinity of the drillhole. Some prior art collection systems involve the provision of an enclosure or hood around the drill stem in the vicinity of the drillhole disposed such that the lower edge of the hood is not in sealing engagement with the ground surface but is supported at a point above the ground so that ambient atmospheric air is drawn into the enclosure as the make up air which mixes with the flow stream of air and entrained particles emanating from the drillhole. This type of system requires substantially more power for driving the suction blower than earlier systems and, due to the substantial increase in the amount of air being handled, requires larger and more expensive system components including ducting, gravity and/or inertial separation equipment and larger impingement type filters for separation of the fine dust particles. Therefore, this type of total collection systems is expensive, presents new problems in regard to mounting on portable drill rigs due to the increased bulk and weight of the system, and requires a great deal more power than should be allocated to the function of cuttings and dust conveying and collection.

Another type of system using so called make up air provides an enclosure around the drill stem in the vicinity of the drillhole which is intended to be in sealing engagement with the ground surface and wherein make up air is drawn into the enclosure through an annular area between the drill stem and the upper surface of the enclosure or hood. Some of the prior art systems discussed herein are also provided with high pressure make up air by way of a separate conduit leading from the drill rig compressor directly to the interior of the hood. These systems require the drill rig bailing air compressor to be much larger and more powerful than the compressors provided on rigs already in use and, of course any new equipment must be designed to accommodate a larger compressor.

Prior art total collection systems of the type described hereinabove have also proven to be relatively sensitive to the ratio of total air flow to the amount of material being conveyed. If a proper relationship between the amount of make up air and total material flow rate is not maintained the system ducting and separating components tend to become plugged and they are sensitive to any accumulation of material in the area of the hood disposed around the drill stem.

Known types of dust collection systems for earth drilling equipment, including the known types of total collection systems, are also not well suited to operate with drilling equipment which is adapted for so called angle drilling wherein the axis of the drillhole is not perpendicular to the surface of the ground in the vicinity of the hole. In known types of drill cuttings collection systems the hoods or enclosures around the drillhole are not capable of providing a suitable seal regardless of the drilling angle or wherein the terrain in the vicinity of the hole is uneven or broken. This factor is particularly critical in regard to the total collection systems which utilized make up air drawn into the system from around the periphery of the lower edge of the hood. Moreover, in rotary drilling equipment wherein a so called pull down force or down thrust on the drill stem is used to control penetration rates the height of the drill rig deck plate and substructure will necessarily change depending on the drilling conditions. This again will effect the position of the hood or enclosure with respect to the ground surface which presents operational problems with the type of total collection system which uses make up air drawn into the hood between the ground surface and the lower peripheral edge of the hood.

Accordingly, there have been a number of problems in the art of dust conveying and collection systems adapted for use with earth drilling rigs for which solutions have not been found prior to the development of the present invention.

It should also be noted that another shortcoming of prior art dust collection equipment pertains to the arrangement of the portion of the enclosure or housing which provides for inertial separation of dust entrained in the moving air stream and its overall arrangement with respect to further structure which encloses the impingement type collection of filter elements. Prior art apparatus is generally characterized by a relatively large enclosure having an inlet for the dust laden air flow stream and which is of sufficient volume to substantially reduce the velocity of the flow as it enters the enclosure. The enclosure is usually divided into the primary separation chamber which accomplishes dust separation by change of direction of the flow stream together with a reduction in velocity of the air flow whereby the air with the remaining fine entrained dust flows into a second chamber and through one or more impingement type filter elements. The substantially clean air then flows through the suction fan or blower and to atmosphere. In a continuing effort to minimize the space requirements for dust collection equipment it has been discovered in accordance with the present invention that a unique compact arrangement of inertial separation flow chambers and impingement type filter elements may be provided which is highly efficient and is particularly suited for heavy dust loadings associated with earth drilling equipment. The improved inertial separation and filtration unit is also well suited to the total dust conveying and collection system of the present invention.

SUMMARY OF THE INVENTION

The present invention provides for a system for conveying and collecting airborne particulate matter which is particularly adapted to be used in conjunction with earth drilling rigs of both the rotary and percussion type which utilize a pressure fluid such as compressed air for evacuating drill cuttings from the drillhole. In accordance with the present invention an improved material conveying duct or lifting head is arranged around the drill stem and directs the flow stream emanating from the drillhole to a chamber for separating relatively coarse material and utilizes the inertia or momentum of the material and the velocity of the air flow stream emanating from the drillhole for conveying substantially all material away from the vicinity of the drillhole. The material lifting head is adapted to be in engagement with the ground surface surrounding the drillhole and, in combination with unique material conveying means provides for conveying both coarse and fine particles away from the drillhole with negligible leakage of the flushing or bailing air.

In accordance with one aspect of the present invention there is provided a total conveying and collection system for handling particles of substantially all sizes that are generated in the formation of a drillhole by conventional percussion and rotary drilling equipment as well as substantially any drilling operation wherein particulate matter is formed and removed from the hole by a high velocity fluid stream such as compressed air. The present invention provides for removing substantially all material evacuated from the drillhole from the vicinity of the hole itself and is adapted to convey the coarse or heavier material to a point remote from the drillhole where it is separated by inertial and gravitational forces acting on the flow stream. The system also may include a novel mechanical conveyor apparatus which is associated with conduit means defining the conveying and collection flow path.

In accordance with another aspect of the present invention it has been discovered that the improved material lifting or conveying head around the drillhole at the ground surface can provide for conveying substantially all of the material being ejected from the hole to a point remote from the drillhole and wherein a suction air fan or blower of reduced capacity is required to conduct the bailing air through an inertial separation stage and a final impingement collection stage before exhausting the bailing air in a substantially clean condition to ambient atmosphere. In accordance with the present invention it has been determined that a suction fan or blower having a nominal inlet volumetric flow rate capacity of less than two times the flow volume of bailing air measured in terms of inlet volumetric flow rate is necessary in order to satisfactorily operate the conveying and collection system of the present invention. In fact, in most applications of the system a flow capacity for the suction fan or blower need only be approximately 1.0 to 1.5 times the volumetric flow rate of bailing air being conducted down the drill stem and into the drillhole as measured in terms of volumetric flow rate at inlet flow conditions to the bailing air compressor.

The improved dust conveying and collection system is preferably operated at a pressure within the system less than the surrounding atmospheric pressure to assure that there is no leakage of dust laden air from around the seal between the head and the ground surface at the drillhole or at any other seal point within the system. In accordance with the present invention the operation of the suction air pump or blower is controlled such that the point in the overall flow stream at which the static pressure becomes less than atmospheric pressure may be moved into the drillhole to assure that any leakage at the seal between the lifting head and the ground surface or between the drill stem and the hood as well as any other point in the system upstream of the fan results in flow into the system of relatively clean ambient air and prevents the escape of any dust laden air from the system.

The conveying and collection system is also provided with means for discharging coarse and fine particles from collection hoppers at various points in the system, which means are normally held closed by the pressure differential between atmosphere and the interior of the system. Separated material is discharged in periodic pulses by momentarily increasing the system pressure by, for example, providing a reverse jet of flushing air to clean the system impingement filters.

During periodic discharging operations the discharge interval is very brief and the direction of air flow is generally into the system through the material discharge doors. This action provides a scrubbing effect on the coarse particles and fine dust particles are retained in the air flow stream leading to the final impingement filters. The periodic sequential discharging of quantities of cuttings also facilitates analysis of formations into which the drill stem is penetrating.

According to the present invention an improved head disposed around the drill stem and in sealing engagement with the ground surface around the drillhole provides for conveying the drill cuttings out of the hole at a substantial velocity and changing the direction of flow approximately 45 to 90 degrees or more without dropping coarse particles or cuttings in the immediate vicinity of the hole. Accordingly, the material lifting head of the present invention, in conjunction with a mechanical conveyor disposed adjacent to the head and within a conveying duct connected to the head, provides for removal of substantially all of the material being ejected from the drillhole to a point remote from the ground surface around the drillhole. The head is also adapted to operate in conjunction with a separation chamber which provides for a substantial portion of the heavier particles or cuttings to be separated from the bailing air flow by gravitational and inertial forces and then dispensed from the chamber which is located at a point remote from the drillhole itself.

The present invention provides for several embodiments of telescoping and extendable material lifting heads. According to one arrangement the head is connected to an extendable pressure fluid cylinder actuator which, during operation of the collection system, extends the head into substantial sealing engagement with the ground surface surrounding the drillhole and continually biases the head into such sealing engagement regardless of minor vibratory or other operational movement of the drilling rig. In accordance with another embodiment a unique telescoping head is provided which is connected to a pressure fluid actuated extension cylinder or the like, and is provided with a gimbal or universal mounting arrangement. Accordingly, the head adapts to an uneven ground surface and is also particularly suitable for angle or slant hole drilling operations. A control system is provided for the material lifting head of the present invention which is operable to extend and retract the head with respect to the drill rig frame in accordance with operation of the bailing air system. Accordingly, the head is automatically extended and retracted in accordance with turning on or off the flow of bailing air to the drillhole, respectively.

The present invention still further provides a head for a dust conveying and collection system which is particularly adaptable for use with percussion drilling equipment wherein extension drill rods are interconnected by coupling members of a larger diameter than the drill rod itself. The improved head is capable of providing a suitable seal around the drill stem during drilling operations but includes movable seal and deflector plate members which are operable to permit passage of the drill stem couplings and bit through the head.

The present invention still further provides for a novel combined mechanical conveying mechanism and conveying duct whereby the velocity of the bailing air flow stream is reduced to allow gravitational forces to collect relatively heavy cuttings and particles on, for example, an endless belt conveyor which is substantially sealed from ambient atmosphere to prevent dust laden air from escaping. The improved mechanical conveyor and gravity separation chamber together with the novel head and a combined inertial separation and impingement filtration unit of the present invention provides an outstanding total conveying and collection system for airborne particulate matter which is particularly suited for use with relatively large earth drilling rigs.

In the development of the present invention there has also been provided an improved dust collector and filter unit comprising a compact enclosure having gravity and inertial dust separation chambers together with impingement type filters mounted in such a manner as to prevent excessive loading of the filters and requiring a minimum number and size of filter elements. In accordance with the present invention a dust collector unit is provided wherein an inlet chamber is formed into which dust laden air is conducted at relatively high velocity and wherein, along one side wall of the chamber, one or more spaced apart separate filter element chambers are provided in which impingement type filter elements are mounted. The filter element chambers are in communication with the inlet chamber through spaced apart openings in the side wall of the inlet chamber.

It has been determined in accordance with the filter unit of the present invention that dust laden air may be injected into the inlet chamber along a path adjacent to spaced apart filter element chambers whereby the lower velocity peripheral portions of the flow stream, which retain only relatively fine dust particles, are diverted into the filter element chambers. A further inertial and gravity separation chamber is provided at the downstream end of the inlet chamber to separate relatively coarse material from the flow stream. Each of the separate filter element chambers is also of such a geometry as to provide for inertial separation of dust particles before the flow stream finally flows through the impingement type filters. Moreover, each of the filter element chambers is substantially isolated from adjacent chambers so that reverse jet cleaning of the filter elements may be carried out without excessive loading of dust on adjacent elements. The overall arrangement of the improved dust collection unit of the present invention is particularly compact and highly efficient and has been made possible substantially due to the discovery that the velocity of the air flow stream entering each of the one or more filter element chambers is reduced rapidly in relation to the distance from the opening into the filter element chambers whereby the heavier airborne particles may be passed in proximity to the openings into each of the separate filter element chambers without overloading the respective filter elements disposed therein. The amount of particulate matter filtered out by the impingement type filters is relatively low and provides for air flow to filter element surface area ratios which are higher than that normally permitted for similar dust removal and collection applications and apparatus.

Accordingly, the present invention is made up of a number of improved elements which, in combination, provide a total conveying and collection system for airborne particulate matter which is superior to known systems. The system is particularly adapted for handling the removal of drill cuttings and the like from the vicinity of a drillhole as well as preventing the ejection of dust laden air into the ambient atmosphere. An improved material conveying or lifting head surrounding the point of ejection of a high velocity flow stream of dust laden air from a drillhole or the like together with improved conveying and gravity separation apparatus and a novel final separation and collection unit provides a system which is capable of operating without using so called make up air in the system and, by minimizing inflow leakage, may operate with a suction blower or pump operating at an inlet volumetric capacity of 1.0 to 1.5 times the bailing air volumetric flow rate. Moreover, the system requires less power, handles lower quantities of air than prior art systems, is more compact, lighter in weight, less expensive to manufacture and more reliable in operation.

The advantages and superior features of the present invention will be further appreciated by those skilled in the art upon reading the following detailed description of the preferred embodiments in conjunction with the drawings.

BRIEF DESCRIPTION OF THE DRAWINGS

FIG. 4 is a longitudinal side elevation of the dust collecting and filter unit of the system of the present invention;

FIG. 5 is a section view taken substantially along the line 5—5 of FIG. 4;

FIG. 6 is a transverse end view of the dust collection and filter unit illustrated in FIGS. 4 and 5;

FIG. 15 is a perspective view of another alternate embodiment of a conveying head and associated conveying mechanism of the present invention.

DESCRIPTION OF THE PREFERRED EMBODIMENTS

The dust conveying and collecting system of the present invention will be described in relation to several preferred embodiments which are adapted to be used in connection with portable earth drillings rigs for drilling blast holes as well as virtually any type of earth drilling rig which utilizes compressed air for so called flushing or bailing air for removing drill cuttings from the drillhole. The drawings are not necessarily to scale and certain portions have been exaggerated to illustrate details of the structure.

Figure 1:
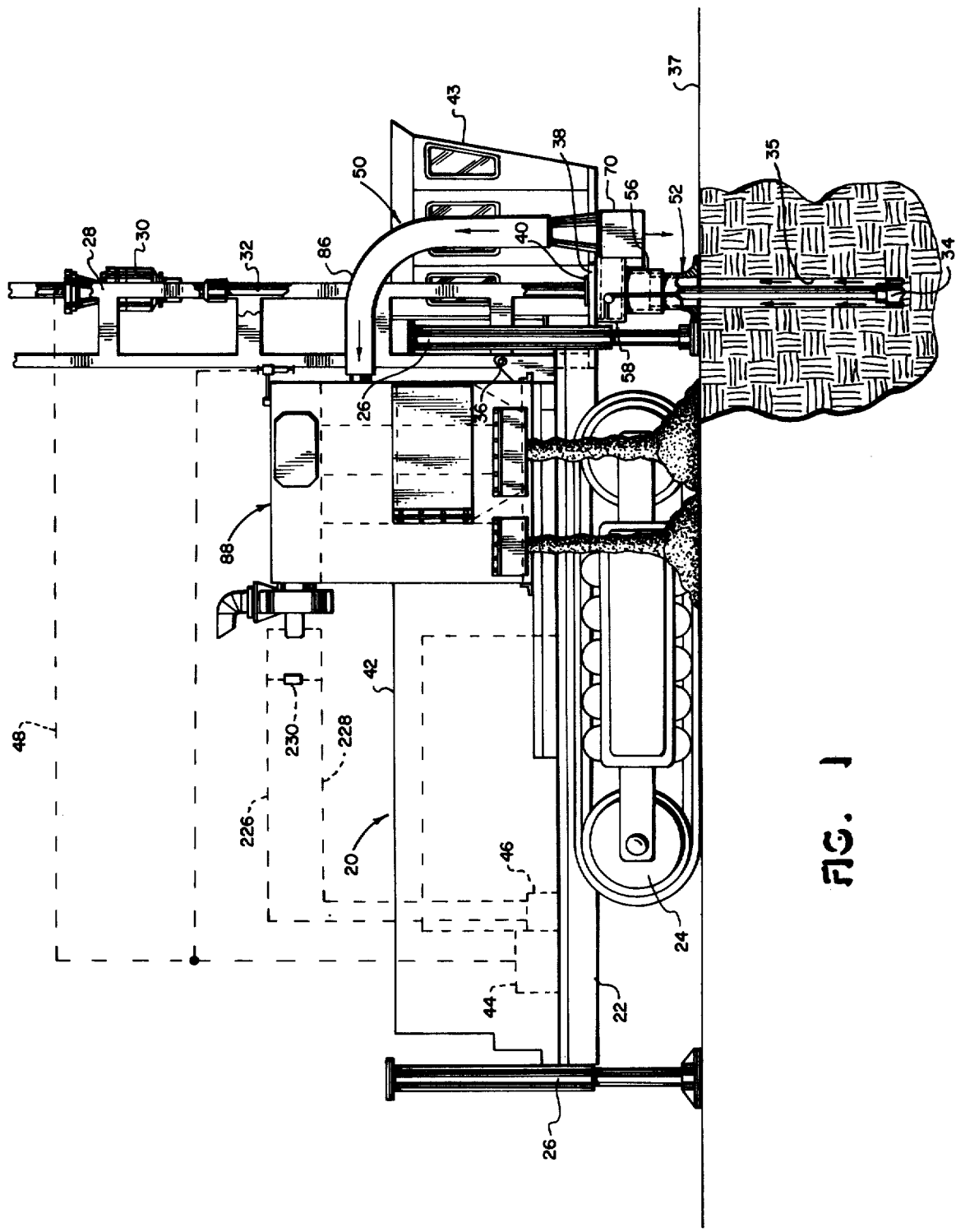
FIG. 1 is a side elevation of a portable earth drilling rig including the dust conveying and collection system of the present invention.

Referring to FIG. 1, one embodiment of a dust conveying and collecting system in accordance with the present invention is adapted for use on a portable earth drilling rig generally designated by the numeral 20. The drilling rig 20 is of the type which is adapted for drilling relatively large diameter blast holes in the range of 50 to 200 feet deep, which rigs are used in connection with surface mining and mineral extracting operations. The drilling rig 20 includes an elongated generally rectangular frame 22 supported on a crawler type undercarriage 24. The frame 22 includes a plurality of spaced apart hydraulic cylinder type jacks 26 which may be disposed at each of the four corners of the frame or in a triangular pattern. The jacks 26 are adapted to support the rig 20 during drilling operations to stabilize the rig and relieve stresses on the undercarriage 24.

The drillng rig 20 includes an elongated mast 28 which is adapted to support a rotary power head or swivel 30 for reciprocating linear movement along the mast in a known manner. The head 30 is adapted to rotatably drive an elongated drill stem 32 made up of one or more elongated hollow pipe members suitably connected to each other in end to end relationship. The head 30 is adapted to rotate the drill stem 32 which includes a rotary type drill bit 34 disposed on the distal end thereof. The bit 34 may be of the conventional roller cone type which forms a drillhole 35 by localized crushing and fracturing of the earth and rock formation. The mast 28 is pivotally mounted on the frame 22 at a pivot 36 so that the mast may be reclined for transport as well as for drilling holes at an angle other than the vertical direction as shown in the drawing. The lower end of the mast 28 includes a generally horizontal deck plate 38 which is adapted to support a bushing 40 through which the drill stem 32 projects.

The drilling rig 20 also includes a machinery house 42 in which suitable prime movers such as a diesel engine or electric motors are located for driving the various operating mechanisms on board the rig and which include an air compressor, indicated generally by the numeral 44, and a suitable hydraulic pump, indicated by the numeral 46.

The removal of drill cuttings from the drillhole 35 is accomplished by conducting compressed air from the compressor 44 through a suitable conduit 48, indicated schematically in FIG. 1, to the rotary head 30 and by way of suitable passageways in the head to the interior of the drill stem 32. The pressure air is conducted down through the drill stem 32 and out through suitable orifices in the bit 34 to create a high velocity fluid flow stream in the annulus formed between the exterior surface of the drill stem 32 and the bore wall of the drillhole 35. This high velocity flow stream of so called flushing or bailing air carries the drill cuttings upward and out of the drillhole 35 at the ground surface 37. The cuttings generally consist of a combination of very fine to relatively coarse particles of soil and rock ranging from dust particles as small as 4 to 5 microns in nominal dimension to large particles several millimeters in diameter. The quantity of air required to remove drill cuttings from a hole in the range of 10 to 15 inches in diameter may be as much as twelve hundred to fifteen hundred cubic feet per minute of air rated at compressor inlet conditions. Due to the loss of compaction of the material from fragmentation, a hole 10 inches in diameter and 120 feet deep will create a quantity of drill cuttings occupying a space on the surface of as much as 80 to 100 cubic feet. The material is, of course, not only abrasive and potentially damaging to the machinery but the tremendous volumes of fine particles blown out of the hole at high velocity will create clouds of dust which, if not controlled, are sources of environmental pollution. Accordingly, as mentioned hereinabove several efforts have been made to devise equipment which is adapted to convey and control the cuttings to prevent contamination of the rig equipment as well as pollution of the working environment of the machinery operating personnel.

The present invention is adapted to provide for significant improvements in handling the wide range of sizes of drill cuttings encountered in earth drilling operations with rotary as well as percussion type drilling equipment. In regard to drilling rigs which are adapted to drill relatively large holes in the range of hole diameters generally greater than five inches, an embodiment of the present invention, generally designated by the numeral 50, is adapted for use with the drilling rig 20, for example. The dust conveying and collecting system 50 includes an improved structure which is a generally tubular enclosure 52 referred to herein with regard to several embodiments as a material conveying or lifting head as opposed to the so called hoods of prior art dust collection systems. The head 52 is adapted to be disposed around the drillhole 35 at the ground surface 37 to provide a conveying passageway for all of the drill cuttings emanating from the drillhole. The head 52 has an interior flow passageway not substantially larger in flow area than the drillhole 35. The proportions of the head 52 as well as other embodiments disclosed will be discussed in further detail herein.

Figure 2:
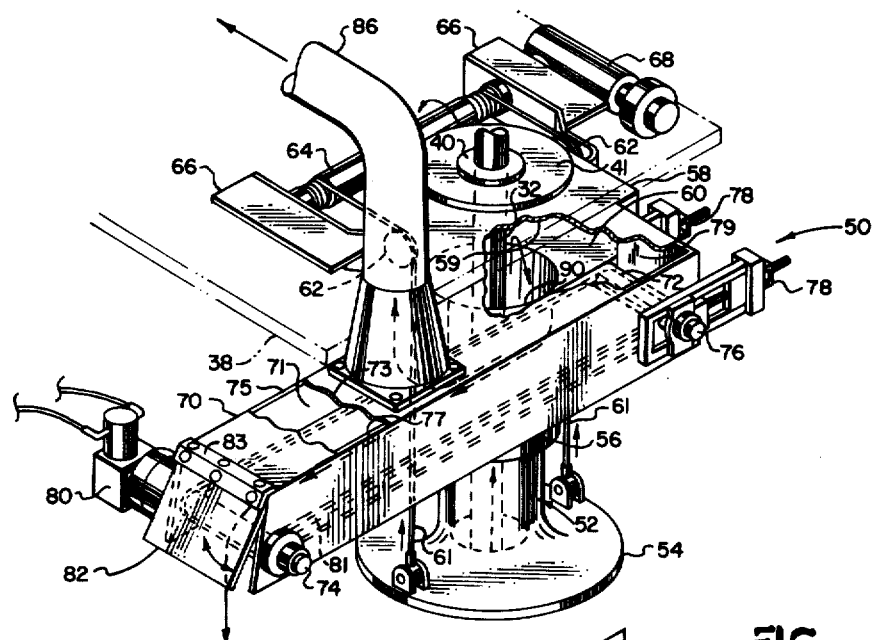
FIG. 2 is a detail perspective view of the embodiment of the dust conveying head and conveying mechanism shown in FIG. 1.

Referring also to FIG. 2, the head 52 comprises a cylindrical hollow member having a radially outwardly projecting lower flange 54 adapted to be in substantially fluid tight engagement with the ground surface. The head 52 is telescopingly interfitted in a stationary section 56 which depends vertically from a generally hollow box-like enclosure 58 having an interior chamber 60 for receiving the drill cuttings and bailing air emanating from the drill hole 35. The head 52 is adapted to be slidably disposed within the vertically depending section 56 in close fitting relationship thereto.

The head 52 is provided with mechanism for extending and retracting the head with respect to the deck plate 38, which mechanism includes a pair of spaced apart flexible cables 61 which are suitably connected to the flange 54, are reaved over sheaves 62 mounted on the exterior of the enclosure 58 and are adapted to be wound on a rotatable shaft 64. The shaft 64 is suitably rotatably mounted on spaced apart frame members 66 which are themselves mounted on the lower side of the deck plate 38. The shaft 64 is rotatably driven by a drive mechanism 68 which includes a hydraulic motor and suitable gearing to provide for raising and lowering the head 52 by rotation of the shaft 64 to wind the cables 61 onto and off of the shaft, respectively. Accordingly, the head 52 may be controlled to be in positive engagement with the ground surface 37 during drilling operations regardless of variations in the height of the deck plate 38 from the ground surface. The head 52 is preferably formed to have an inner diameter large enough to permit the passage of the drill bit through the head and up through an opening in the deck plate 38 which supports the bushing 40. As shown in FIG. 2, the bushing 40 is adapted to fit into a supporting collar 41 which may be removably mounted on the deck plate. The bushing 40 is adapted to be removably fitted in the collar 41 and to have a bore diameter only slightly larger than the diameter of the drill stem 32 to prevent the flow of drill cuttings and bailing air upward onto the deck of the rig 20.

It has been determined in accordance with the present invention that by properly sizing the flow passages in the head 52 and the enclosure 58 together with improved means for conveying and collecting the drill cuttings that the energy in the bailing air flow stream emanating from the drill hole may be more effectively utilized to convey the cuttings to a point remote from the drillhole and to prevent the collection of drill cuttings around the drillhole in the vicinity of the head. For applications to relatively large drill rigs where the volume of drill cuttings emanating from the drillhole is substantial I have provided improved means for conveying the coarse drill cuttings to a point remote from the immediate vicinity of the drillhole for the reasons discussed hereinabove. As illustrated in FIG. 2, the dust conveying and collecting system 50 includes an elongated enclosure 70 forming a conveying duct for the flow stream of bailing air and drill cuttings flowing through the interior 60 of the enclosure 58. The enclosure 70 is mounted adjacent to and may be considered to be a part of the enclosure 58. The enclosure 70 comprises an elongated rectangular duct having an interior flow chamber 71 which is partly defined by a top wall 73, and spaced apart side walls 75 and 77 and which are disposed closely adjacent to the opposite longitudinal sides of an endless conveyor belt 72 mounted on suitable spaced apart drive shafts 74 and 76. The shaft 76 may be adjustably mounted on the enclosure 70 by suitable tension adjusting mechanism 78. The drive shaft 74 is adapted to be rotatably driven by a hydraulic motor 80 to provide for driving the belt 72 in a direction to convey coarse drill cuttings that fall thereon along the enclosure 70 and out through a hinged door 82 disposed at one end of the enclosure and normally engaged with or spaced closely adjacent to the end of the belt 72. The door 82 is adapted to be forced open only when a sufficient amount of material is lodged against the door by the belt 72 and by a momentary reduction of the pressure differential between atmosphere and the chamber 71. The door 82 is normally biased in the closed position by the abovementioned pressure differential. The door 82 may be characterized as a resilient member made of sheet rubber, for example, which may be yieldably deflected to the open position to allow material to exit the enclosure 70 as required. The opposite end of the enclosure 70 includes a transverse end wall 79 spaced closely adjacent to the opposite end of the belt 72. A horizontal seal plate 81 is contiguous with the side walls 75 and 77 and extends longitudinally between the shafts 74 and 76 and the runs of the belt 72.

The conveying and collection system 50 further includes a duct 86 which is connected to the enclosure 70 and to a dust collection and filter unit, generally designated by the numeral 88 in FIG. 1, and which will be described in further detail herein. The dust collection and filter unit 88 is adapted to separate both coarse and fine dust particles entrained in the bailing air flow stream and which have not been separated from the flow stream in the conveying enclosure 70. In accordance with the present invention it is contemplated that substantially all of the relatively coarse drill cuttings will be separated from the bailing air flow stream in the enclosure 70. However, particulate material required to be separated from the bailing air flow stream is likely to be of a wide variety of particle sizes and under certain operating conditions particles which may be considered relatively coarse will remain entrained in the bailing air flow as it exits the enclosure 70 and flows into the filter unit 88. Accordingly, as will be explained in further detail herein, the collection and filter unit 88 is adapted to separate the remaining relatively coarse particles from the bailing air flow stream as well as the very fine dust particles which are likely to remain entrained in the air even at relatively negligible flow velocities.

The present invention contemplates an improved apparatus and method for conveying and collecting particulate material entrained in a bailing air flow stream emanating from a drillhole wherein the inertia of the relatively coarse material and the velocity of the air stream entering an enclosure can be utilized to convey said coarse material to a point wherein it can be moved substantially away from the drillhole and wherein at the same time the finer material remaining entrained in the air stream may further be removed without interfering with the separation of the coarse material. The annular flow area of the interior of the head 52 is proportioned to be such that the air stream emanating from the drillhole maintains a substantial velocity until entering the enclosure 70, and the inertia of the particulate matter being conveyed out of the drillhole is sufficient to keep the coarse material as well as the fine material entrained in the air stream until it reaches the enclosure. By way of example, a head for use with drill stems for drilling four inch diameter holes has a six inch diameter interior flow passage.

Referring again to FIG. 2, the passageway 90 formed by the interior of the enclosure section 56 opens into the enclosure 58 at a point approximately even with the top of the conveyor belt 72. The relatively high velocity bailing air flow stream entering the interior 60 of the enclosure 58 impinges against the interior of the top wall 59 of the enclosure and is redirected into the interior 71 of the elongated duct enclosure 70 without the loss of coarse particulate material back down through the passageway 90 into the drillhole. It is preferable that the top wall 59 be spaced from the flange 54, in the extended position of the hood, a distance approximately four to six times the nominal diameter of the drillhole so that a maximum flow stream velocity may be maintained to impinge the top wall and redirect the cuttings toward a lower pressure zone within the conveying enclosure. Thanks to the close fitting engagement of the flange 54 with the ground surface 37, the close interfit between head 52 and the depending duct section 56, the close fit of the bushing 40 around the drill stem 32 and the negative pressure maintained in the system there is virtually no loss of bailing air flow together with entrained particulate material out of the conveying system 50. Only a slight amount of leakage occurs between the shafts 74, 76 and the opposite transverse edges of the seal plate 81, the clearance between the belt shafts 74 and 76 and the respective side walls 75 and 77 and the clearance between the end wall 79 and the belt 72.

As the flow stream enters the interior 71 of the enclosure 70 the enlarged volume of the interior 71 in relation to the flow area of the interior of the head 52 and the enclosure 58 provides for some reduction in the velocity of the flow stream wherein relatively coarse material will separate due to gravity forces and the loss of momentum of the material. Accordingly, a substantial quantity of material will fall onto the conveyor belt 72 to be conveyed out of the enclosure through the door 82 and deposited on the ground at a point remote from the drill hole. The substantially horizontal impingement and deflecting surface formed by the top wall 59 will redirect the flow of the bailing air and the entrained material into the enclosure 70 without materially reducing the momentum of the coarse material due to the velocity of the continuous bailing air flow stream jetting from the drillhole through the passageway 90. In contrast with prior art dust conveying and collection systems it is contemplated that by maintaining the velocity of the bailing air flow stream at a substantial level to keep the drill cuttings entrained therein until the flow stream has reached the interior 71 of the enclosure 70, and by substantially preventing the in-flow of atmospheric air into the bailing air flow stream, that the suction blower or pump may be significantly reduced in its volumetric capacity requirement.

It is contemplated that in accordance with the present invention that a system for relatively large blast hole drills may require a suction blower or pump at the filter unit which has a nominal inlet volumetric capacity of only 1.0 to 1.5 times the volumetric flow rate of system bailing air. This capacity is considerably less than is required by known prior art total collection systems. The improved conveying apparatus including the head 52 and the enclosures 58 and 70 together with the filter unit 88 of the present invention provides a total collection system which is operable to remove all of the particulate material from the vicinity of the drill hole and to extract substantially all of the particulate material regardless of particle size from the bailing air flow stream before the bailing air is exhausted from the system to atmosphere.

Figure 3:
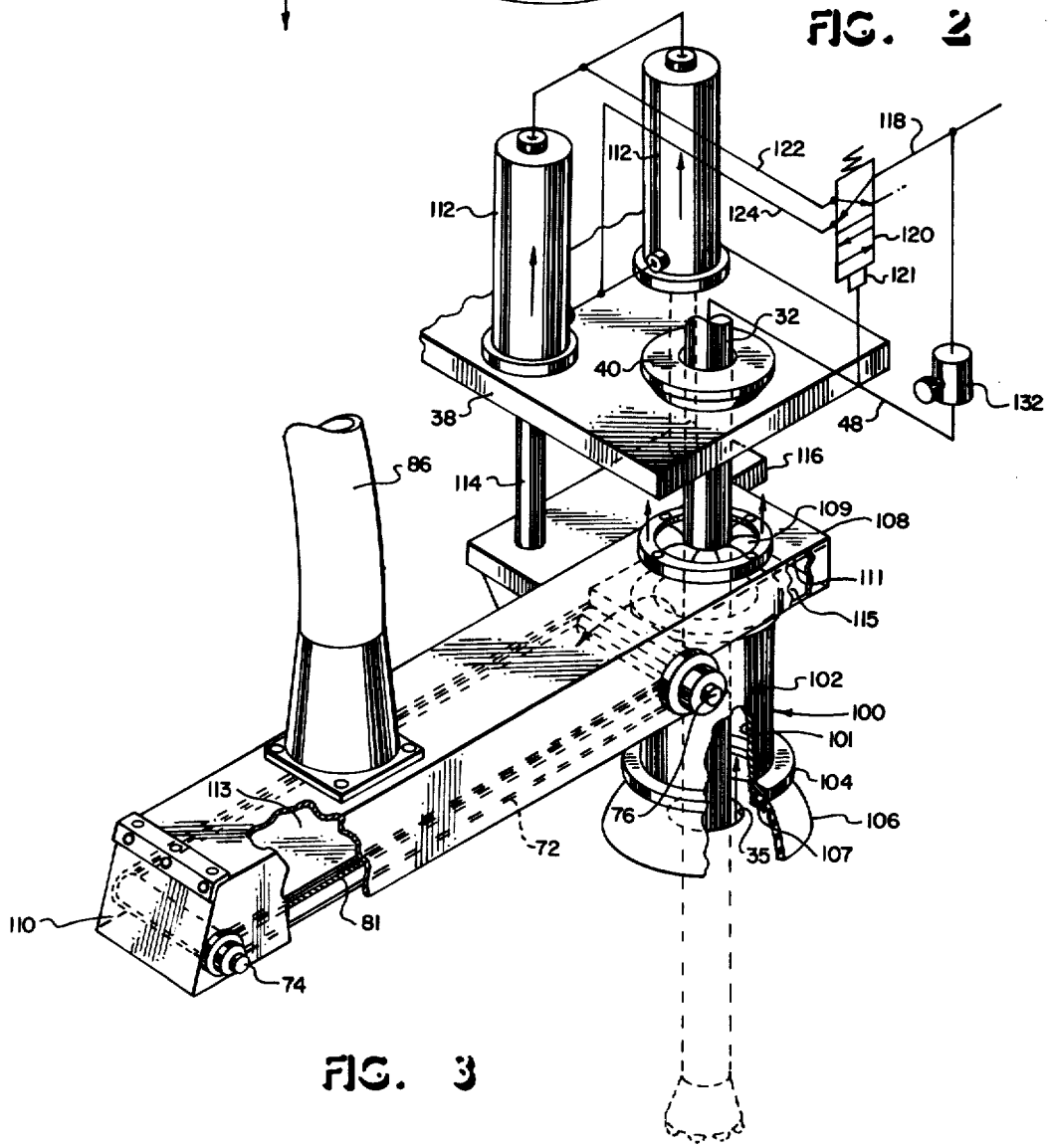
FIG. 3 is a detail perspective view of an alternate embodiment of a conveying head and associated conveying duct and mechanism of the present invention.

Referring to FIG. 3, an alternate embodiment of a lifting head and a coarse cuttings separation and conveying unit is illustrated. The head illustrated in FIG. 3 is generally designated by the numeral 100 and comprises a generally cylindrical tubular member 102 including a lower annular flange 104 to which is secured a frusto conical shaped collar 106 comprising a secondary flexible seal suitably secured by a flange plate 107. The collar 106 is preferably formed of a resilient elastomeric material which is deflectable to conform to any surface irregularities in the ground surface adjacent to the drill hole 35. The head 102 is mounted directly beneath and adjacent to one end of an elongated conveying duct or enclosure 108, similar to the enclosure 70 illustrated in FIG. 2. The enclosure 108 includes an inlet portion having top and bottom walls 111 and 115, respectively. An open bottom portion of the enclosure 108 includes an endless conveyor belt 72 for conveying coarse drill cuttings to a point remote from the drill hole 35. The enclosure 108 also includes a hinged door 110 arranged similar to the door 82 at the end of the enclosure opposite the end to which the head 100 is attached. A seal plate 81 extends between the side walls of the enclosure 108 from the shaft 74 to the shaft 76 and terminates closely adjacent the periphery of each of the shafts to substantially prevent leakage air flow into or out of the interior 113 of the enclosure.

In the embodiment illustrated in FIG. 3 the head 100 together with the coarse drill cuttings separation and conveying enclosure 108 is vertically extendable and retractable with respect to the deck plate 38 by means of a pair of spaced apart pressure fluid cylinder and piston type actuators 112 mounted on the deck plate and having their respective piston rods 114 extending below the deck plate and connected to a supporting bracket 116 for the head and conveying enclosure assembly. The cylinder actuators 112 are of the double acting type and are adapted to be in communication with a source of compressed air such as the compressor 44 by way of a conduit 118 and a two-position four way valve 120. The valve 120 is adapted to supply pressure fluid to one end of each of the actuators 112 while venting the cylinder chamber at the opposite end and, upon being shifted from one position to another, to reverse the direction of fluid flow to and from the cylinders by way of the respective sets of conduits 122 and 124 shown schematically in FIG. 3. The valve 120 is adapted to be normally in a position to provide pressure fluid through conduits 124 by way of conduit 118 to move the enclosure 108 and the head 100 away from the drill hole 35 in a retracted position. The valve 120 is adapted to receive pressure air in a pilot actuator 121 by way of a conduit 126 which is in communication with the conduit 48 indicated schematically in FIG. 3. The conduit 48 is adapted to conduct bailing air to the drill stem 32 in a manner as previously described.

The normal arrangement of the bailing air control circuit includes a valve 132 which may be directly or remotely controlled by the drill operator to turn on and off the bailing air flow to the drill stem 32. Accordingly, with the circuit shown schematically in FIG. 3 when the valve 132 is actuated to supply bailing air to the drill stem 32 the valve 120 is automatically actuated to conduct pressure air to the cylinders 112 to extend the head 100 and the enclosure 108 into the extended position with respect to the deck plate 38. Moreover, regardless of variations in the height of the deck plate 38 which may result from the extension of the jacks 26 as well as some slight vertical movement of the drill rig, which is often encountered in drilling operations, the flange 107 and collar 106 will be biased into engagement with the ground around the drill hole 35 any time bailing air is being conducted down the drill stem 32. The cylinders 112 are operable to automatically retract the head 100 and the enclosure 108 when bailing air has been shut off thereby assuring that when the drill rig is to be moved from one worksite to the other that the head is not inadvertently left extended and in engagement with the ground.

Since the enclosure 108 is extensible and retractable with respect to the deck plate 38 it is provided with a suitable flexible seal element 109 to provide for the drill stem 32 to extend through the enclosure but to prevent the escape of bailing air and drill cuttings upward through the enclosure around the drill stem. The seal 109 may be of several types and might include a series of resilient deflectable circular sector shaped plate-like members which may be deflected to permit movement of the drill bit upward through the head and the enclosure when the drill stem is retracted completely out of the drillhole. The enclosure 108 also includes a substantially horizontal flow impingement and deflecting surface comprising the top wall 111 of the enclosure 108. By providing a substantial seal around the drill hole 35 with the sealing flange and resilient collar 106 and by providing that the interior passageway 101 of the head 100 is proportioned to be sufficiently larger than the diameter of the drillhole to prevent choking of the flow stream, the velocity of the bailing air flow stream together with the momentum of the entrained drill will maintain the behavior of a free flowing jet until the flow stream impinges the deflecting surface formed by the wall 111 and is redirected longitudinally within the enclosure 108. As the bailing air flow stream passes through the enclosure 108 the enlarged interior volume of the enclosure will result in a reduction in the flow velocity and the coarser drill cuttings will separate due to gravitational forces acting thereon. The cuttings will fall onto the conveyor 72 whereby they may be conveyed to a point remote from the drillhole for deposit on the ground surface or, if desired, collected for analysis or further processing.

The collection and filter unit 88, which is illustrated in FIG. 1 as being mounted on the side of the frame 22 of the drill rig 20, is illustrated in detail in FIGS. 4 through 6. The filter unit 88 includes a rectangular box-like housing, generally designated by the numeral 140, which is divided into a series of internal chambers by a plurality of interior partitions as will be described hereinbelow. The housing 140 includes a vertical rear wall 142 spaced from and parallel to a vertical front wall 144. The walls 142 and 144 are joined to spaced apart transverse vertical walls 146 and 148. The aforementioned walls are also contiguous with a horizontal top wall 150. The housing 140 includes a bailing air inlet flow chamber, generally designated by the numeral 152 in FIG. 5, which is formed by the vertical rear wall 142, an internal vertical partition 154 spaced from and parallel to the wall 142, a portion of the end wall 146, a portion of the end wall 148 and a sloping bottom wall 156. The bottom wall 156 extends downward from its point of intersection with the rear wall 142 towards the front wall 144 and extends longitudinally to be contiguous with the spaced apart end walls 146 and 148. The bottom wall 156 is also contiguous with opposed transverse sloping bottom wall portions 157 and 159, as shown in FIG. 4. The chamber 152 is also delimited by a horizontally disposed interior partition 158 spaced from the top wall 150. A clean air outlet chamber 160 is formed by the top wall 150, the partition 158, the end walls 146, 148 and the vertical side walls 142 and 144. The inlet flow chamber 152 includes an enlarged separation chamber portion 162 which is also formed in part by a vertical transverse interior partition 164 contiguous with the partition 154, the bottom wall 156, the front wall 144 and the partition 158.

The filter unit 88 further includes a plurality of side by side filter element chambers 170, 172, and 174 which, as shown in FIG. 5, are formed separate from each other by spaced apart vertically disposed partitions 173 and 175. The partitions 173 and 175 extend vertically from the horizontal partition 158 to the bottom wall 156 thereby providing for the filter chambers 170, 172 and 174 to be separate from each other and in flow communication with each other only by way of separate openings in the partition 154 which will be described further hereinbelow. The number and arrangement of the filter element chambers may be varied. For example, only one or two chambers might be required for some systems. Moreover, the chambers could be arranged on both sides of the inlet chamber 152.

Each of the chambers 170, 172 and 174 include vertically extending curved wall elements 180, 182 and 184, respectively, which extend from the underside of the horizontal partition 158 vertically downwardly and are coextensive with porous media type filter elements 186 disposed in each of the filter element chambers, as shown. The filter elements 186 may be of a known type which are constructed of a porous media such as a type of pleated paper through which the bailing air flow is conducted to filter out the very fine dust particles remaining entrained in the bailing air flow stream after gravity and inertial separation of the coarser particles is obtained.

The filter elements 186 are suitably retained in the respective filter element chambers such as by elongated tie rods, not shown, which extend from the closed bottom 187 of each of the filter elements, as shown by way of example in FIG. 4, to engagement with the horizontal partition 158. Each of the filter elements 186 has an outlet duct portion 188 extending into the chamber 160 for conducting substantially dust free air from the respective interiors of the filter elements into the chamber 160 and through an outlet opening 190 shown in FIG. 4. The front vertical wall 144 includes a removable panel or door 192 which may be opened to gain access to each of the filter elements 186 for servicing, as needed.

As illustrated in FIGS. 4 and 6, the filter unit 88 may be provided with suitable reverse air jet cleaning mechanism, generally designated by the numeral 196, and comprising a plurality of nozzles disposed in the chamber 160 and above each of the filter element outlet ducts 188. The reverse air jet cleaning mechanism is operable to periodically deliver brief pulses of compressed air through nozzles 198 in a direction generally opposite to the air flowing through the filter elements 186 to blow accumulated dust off the elements and into the respective filter element chambers. The substantial quantity of dust periodically blown off of the filter elements 186 will settle in respective hopper portions 200, 202, and 204 of the chambers 170, 172 and 174 together with dust separated by the vortical movement of air flowing around the interior side of the curved walls 180, 182 and 184. When a suitable quantity of dust has accumulated in the respective hopper portions hinged doors or flaps 206, which function in a manner similar to a one way valve, will open to allow accumulated material to exit from the hopper portions. Thanks to the arrangement whereby each of the filter chambers 170, 172 and 174 are separate from each other the periodic reverse jet cleaning of each of the filter elements will not permit the dust blown off of one filter element to become entrained with an air flow stream flowing through an adjacent filter element. Accordingly, the cleaning of one or more of the filter elements 186 will not result in sudden loading of an adjacent filter element.

The filter unit 88 is provided with further hopper means for collecting dust and drill cuttings which enter the chamber 152, said hopper means being formed in the lower portion of the chamber and generally designated by the numeral 208 as shown in FIG. 6. Accordingly, drill cuttings entering the chamber 152 and which do not flow on into the separation chamber portion 162, or into the respective filter element chambers, settle into the hopper portion 208. The vertical partition 154 is provided with a plurality of hinged doors 210 which are operable to open to allow dust accumulated in the hopper portion 208 to flow into the respective chambers 170, 172 and 174 and into their respective hopper portions as indicated viewing FIGS. 4 and 6. The doors 210 may be rigid hinged members or preferably comprise flexible flaps which are normally biased in the closed position but yield under the weight of accumulated material to open briefly and allow the material to slide down the interior of the sloping bottom wall 156 into the respective hoppers 200, 202 and 204 and on out of the filter unit 88 in due course.

As shown in FIG. 4 the separation chamber 162 also includes a hinged door 212 providing for periodic discharge of accumulated material from the bottom of the separation chamber which comprises a hopper portion designated by the numeral 214.

As shown in FIG. 4, the filter unit 88 includes a suction blower or pump, generally designated by the numeral 216, which is mounted on the vertical end wall 146 at the opening 190 therein. The suction pump 216 illustrated is of the centrifugal type and includes an impeller 218 disposed within a housing or scroll 220 having an outlet duct 222 for discharging clean air to atmosphere. The impeller 218 is adapted to be rotatably driven by suitable motor means such as a hydraulic motor 224 connected to a source of hydraulic fluid such as the pump 46, shown schematically in FIG. 1. Alternatively, a pneumatic or electric motor could be used. Hydraulic fluid may be supplied to the motor 224 by way of respective supply and return lines 226 and 228 which are suitably interconnected by a flow control valve 230 whereby the flow of fluid to the motor 224 may be controlled to vary the speed of the impeller 218. It will be appreciated by those skilled in the art that other types of suction blower or pump means may be utilized in place of the illustrative pump 216 such as, for example, positive displacement helical screw or straight lobe type blowers or jet ejectors. Moreover, the volumetric capacity of the suction pump may be controlled in other ways than by varying the speed of the drive motor 224 as described herein. The valve 230 as well as the valve 132 shown in FIG. 3 are preferably located on a suitable control panel in a control cab 43 on the rig 20 as shown in FIG. 1.

As shown in FIG. 4, a two position valve 231 is interposed in the lines 226 and 228 and is operable upon commencing delivery of bailing air through line 48 to be actuated to start the pump 216. When air is shut off by valve 132, for example, flow in line 226 is redirected to return line 228.

Referring again to FIG. 5, dust laden air enters the filter unit 88 through an inlet opening 232 in the end wall 148 and which is in flow communication with the duct 86. Air entering the chamber 152 flows in a substantially linear jet stream toward the opposite end wall 146. However, the peripheral portions of the flow field of the jet stream entering the chamber through the opening 232 undergo rapid reduction in velocity and flow through respective openings 234, 236 and 240 in the partition 154 and into the respective filter element chambers 170, 172 and 174. That portion of the flow stream which does not enter the respective filter chambers as described above flows into the separation chamber 162 and into the filter element chamber 170 through an opening 238 in the partition 164. The openings 234, 236, 238 and 240 are disposed in relation to the curved wall portions in the respective filter chambers as illustrated in FIG. 5, are generally rectangular in shape and extend vertically substantially the length of the curved wall portions and the filter elements 186. The location of the openings 234, 236, 238 and 240 also impart a directional flow to the air entering the respective filter element chambers in a substantially curved flow path as guided also by the curved wall portions and the tendency for the air to flow inwardly through the respective filter elements in a somewhat vortical manner. Accordingly, the flow of air into the respective filter chambers provides for inertial separation of at least some of the entrained material, which material impinges the curved wall portions and falls downwardly into the respective hopper portions of the filter element chambers.

It has been determined in accordance with the present invention that a filter unit generally of the configuration described herein and illustrated in FIGS. 4, 5 and 6 is superior to prior art equipment which utilizes inertial as well as impingement type separation of particulate matter from an air flow stream. For example, by arranging the inlet flow chamber 152 as illustrated in the drawings there is provided an inlet flow stream through the opening 232 of sufficient velocity to keep relatively large or coarse particles which have not been previously separated from the flow stream entrained until they impinge the opposite end wall 146 or are diverted by air flowing into the separation chamber 162 and whereby these larger coarse particles do not enter the respective filter element chambers. Moreover, it has also been determined that the peripheral lower velocity portions of the flow stream which will maintain finer dust particles entrained therein, may be diverted into the respective filter element chambers through the openings 234, 236 and 240. Accordingly, the inlet flow chamber 152 and the separation chamber 162 are operative to provide inertial and gravity separation of a substantial portion of the relatively coarse material remaining entrained in the bailing air flow as it enters the filter unit 88. This relatively coarse material either falls into the hopper portion 208 of the inlet chamber 152 or, if of sufficient energy to remain entrained in the moving air stream, impinges the end wall 146 and falls into the hopper portion 214 of the separation chamber 162. Furthermore, that portion of the flow stream which enters the separation chamber 162 undergoes a substantial change in direction due to the end wall 146 and the interior partition 164 as well as the portion of the front wall 144 disposed therebetween. This change in direction further acts to separate material particles remaining entrained in that portion of the air flow stream entering the chamber 162. By the time the flow stream approaches the opening 238 it has been rid of relatively coarse particles and accordingly, together with the low velocity flow entering the filter chambers through the openings 234, 236 and 240 has been sufficiently rid of particulate matter to prevent overloading of the filter elements 186.

The relatively low velocity flow stream portions entering the respective filter element chambers undergo centrifugal and so called vortical flow to further inertially separate entrained material before the air impinges the porous media filter elements. Accordingly, the loading of the filter elements 186 is substantially reduced as compared with prior art filtration units which employ impingement or porous media flow through type filter elements. The improved preliminary separation of particulate material from the air flow stream entering the filter unit 88 before it reaches the filter elements 186 allows a substantial increase in the volumetric capacity per unit of area of the filter media of the elements 186 as compared with prior art filter units. The air flow passing through the respective filter element chambers 170, 172 and 174 flows through the curved flow path indicated between the filter elements and the curved wall adjacent thereto and after passing through the respective filter elements flows into the outlet duct 160 and exits the filter unit 88 through the opening 190 and the suction pump 216 as substantially dust free air.

The arrangement of the separate filter element chambers 170, 172 and 174 disposed side by side and adjacent to the elongated inlet chamber 152 together with the separation chamber 162 substantially eliminates any currents within the filter unit 88 which tend to keep particulate material entrained in the flow stream or re-entrain material which has already been separated. The separate filter element chambers for each of the porous media filter elements 186, which are back-flushable by the air jet cleaning mechanism, also substantially improves the performance of the filter elements since there is no cross flow of dust laden air from an element which is being cleaned to an element which is receiving air flow in the normal course of operation.

It will be appreciated from the foregoing that the embodiments of the hoods and associated conveying ducts illustrated in FIGS. 1, 2 and 3 in combination with the filter unit 88 provides a superior dust conveying and collection system which may be used in a wide variety of applications for filtering particulate material out of an air flow stream but is advantageously used in connection with portable earth drilling rigs which utilize compressed air as the drill cuttings bailing medium.

In the operation of the overall system, as illustrated in FIG. 1, it has further been determined that by controlling the speed of the pump 216 that the bailing air pressure within the system may be controlled to transition from a positive pressure to a negative pressure, with respect to the ambient atmospheric pressure outside of the system, at any selected point along the bailing air flow path including that portion of the flow path within the drill hole 35. It is, in fact, desirable to control the speed of the pump 216 such that the static pressure in the system 50 is always negative at a point adjacent to or above the ground surface 37. Accordingly, by maintaining a pressure of the flow stream to change from a positive to a negative pressure, with respect to atmospheric pressure, at a point in the drillhole just below the surface 37 any tendency for dust laden bailing air to leak out of the system is eliminated. Any leakage around the base of the head or anywhere in the conveying and collection system is leakage of ambient atmospheric air into the system so that any tendency for dust laden air to escape is negated.

By providing the improved material lifting head in accordance with the present invention together with a low power consuming mechanical conveying system for conveying the relatively coarse drill cuttings away from the drill hole the total power required for the conveying and collection system of the present invention is indicated to be substantially less than systems heretofore known. For example, it has been determined that a suction pump such as the pump 216 in combination with a system in accordance with the present invention may be required to have an inlet volumetric capacity of approximately only 1.0 to 1.5 times the volumetric flow rate of bailing air being conducted down the drill stem. This is considerably less than the suction blower or pump requirements of prior art systems. There are several factors which contribute to this low volumetric capacity requirement of the blower including the improved lifting head invention which forms a positive seal with the earth's surface adjacent to the drillhole, and the unique mechanical conveying system which is particularly useful in operation of the system with relatively large drill rigs. The volume of drill cuttings normally produced by relatively large drills would require substantial amounts of power to provide conveyance of all of the drill cuttings away from the drillhole if pneumatic conveying was totally relied on for that function. Furthermore, the improved filter unit 88 of the present invention more effectively utilizes the flow characteristics of a moving air stream having particulate matter entrained therein whereby inertial and gravity separation of material from the flow is maximized and the impingement type filter elements are presented with bailing air flow which has a substantially reduced amount of entrained particulate matter.

The overall arrangement of the components of the filter unit 88 are so advantageous that the amount of filter area for the impingement type filter element 186 for a given volumetric flow rate of bailing air through the unit may be reduced as compared with prior art systems. Moreover, the provision of the separate filter element chambers having the substantially arcuate wall portions surrounding their respective filter elements provides for improved separation of material from the flow stream before it actually impinges the filter elements and further prevents any cross flow of dust from one filter element to another during reverse jet cleaning of the respective elements.

Figure 7:
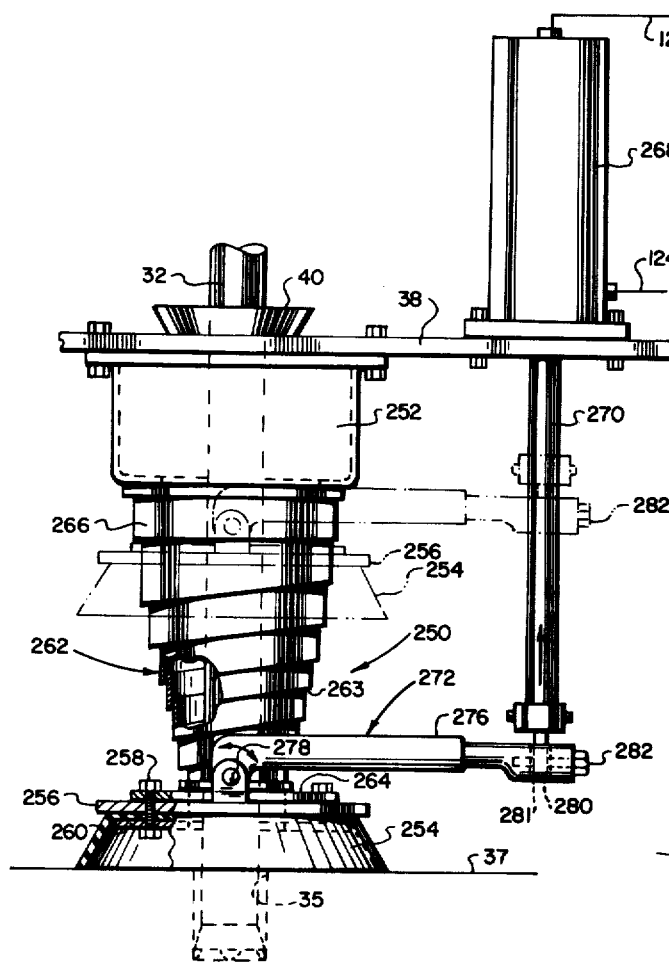
FIG. 7 is a side elevation of another embodiment of a retractable material lifting head in accordance with the present invention.
Figure 8:
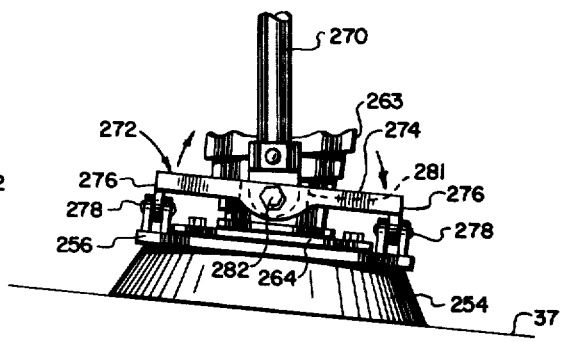
FIG. 8 is a side elevation of the head illustrated in FIG. 7 illustrating further details of the gimbal mounting arrangement.

Referring to FIGS. 7 and 8 of the drawings, there is illustrated a further alternate embodiment of a drill cuttings conveying and collecting head in accordance with the present invention. In many applications of drilling equipment the ground surface at the site of the drillhole is uneven or not substantially parallel to the deck plate of the drilling rig. This may be due to uneven terrain at the immediate site of the drillhole with respect to the terrain that the rig is sitting on or, in some instances, it is desired to drill angle or slant holes. Certain drilling rigs are adapted to operate with their mast or feed beams partially reclined for drilling such holes and accordingly, the deck plate is not parallel to the ground surface.

Referring to FIG. 7, there is illustrated a dust conveying and lifting head, generally designated by the numeral 250, which is adapted to be in substantial sealing engagement with the ground surface 37 under conditions where the ground surface may not be parallel to the deck plate 38 as well as when the rig is operated to drill angle holes or the like. In the embodiment of the invention illustrated in FIGS. 7 and 8 the head 250 is adapted to be connected to a conveying duct 252 similar to the duct or enclosure 108 but fixed to the deck plate 38. The head 250 includes a resilient, generally frusto conical skirt portion 254 which is adapted to be in forcible engagement with the ground surface 37 and is suitably secured to a substantially circular support plate 256 by a plurality of threaded fasteners 258. The fasteners 258 also secure an annular support or sealing flange 260 engaged with the skirt 254 as shown by the detailed broken portion of FIG. 7. The skirt 254 is shown just in contact with the ground surface. In normal operation the skirt would be deformed to the position shown for the skirt of the head illustrated in FIG. 13, so that the sealing flange 260 would be engaged also with the surface 37. The head 250 includes a telescoping portion comprising an enclosure formed by a spirally coiled flat metal band 262 which is relatively tightly coiled to form a continuous duct. The band 262 is connected at its lower end to an annular collar 264 which is suitably secured in assembly with the support plate 256 and the skirt 254 as shown. The upper end of the telescoping spiral band 262 is suitably secured to a cylindrical housing member 266 mounted on the underside of the duct 252.

The head 250 is operable to be extended into the ground engaging position, illustrated by the solid lines in FIG. 7, by an extensible pressure fluid cylinder actuator 268 similar to the actuators 112 illustrated in FIG. 3. The actuator 268 may, for example, be interconnected with the source of compressed air by way of the conduits 122 and 124 in place of the cylinders 112 of FIG. 3. The actuator 268 includes a piston rod 270 which is connected to a substantially U-shaped yoke member, generally designated by the numeral 272, having a base portion 274 and a pair of parallel projecting legs 276. The legs 276 are pivotally connected to the support plate 256 at their respective distal ends by means of pivot pins 278, as illustrated in FIGS. 7 and 8. The distal end 280 of the piston rod 270 is disposed in a cooperating slot 281 in the base portion 274 of the yoke member 272 and is retained in pivotal connection therewith by a pivot pin 282. Accordingly, the yoke member 272 provides a gimbal or universal type interconnection between the base plate 256 of the head and the actuator 268 whereby the skirt 254 will be adaptable to engage the ground surface 37 regardless of its angularity with respect to the deck plate 38, that is, within the limits of range of movement of the gimbal type connection between the actuator and the head.

Moreover, thanks to the arrangement of the extensible and retractable tubular duct provided by the spiral coiled band 262 the skirt 254 will be biased into engagement with the ground surface 37 in the same manner that the head 100 is continually biased as long as bailing air flow is being conducted the drill hole 35. The coiled metal band 262 is proportioned such that the helical convolutions 263 of the band overlap each other slightly even in the greatest extended position of the band and also are substantially contiguous with one another to prevent any leakage of bailing air into or out of the interior of the head.

The band 262 as well as the skirt 254 are subject to severe abrasion due to the high velocity flow stream of bailing air and the abrasive drill cuttings entrained therewith. Accordingly, the tubular band 262 and the skirt 254 may be replaced as needed. Those skilled in the art will appreciate that the lifting head 250 may be used in conjunction with the conveying duct enclosure 70 as well as the duct 252 and, in fact, the duct 252 may include a mechanical conveying mechanism similar to the mechanism disposed in the enclosures 70 and 108. Artisans will also appreciate that two cylinders similar to the cylinder 268 may be used in place of a single cylinder, if necessary, wherein the distal ends of the respective piston rods would be connected at spaced apart points on the base portion 274 of the yoke member 272.

Figure 10:
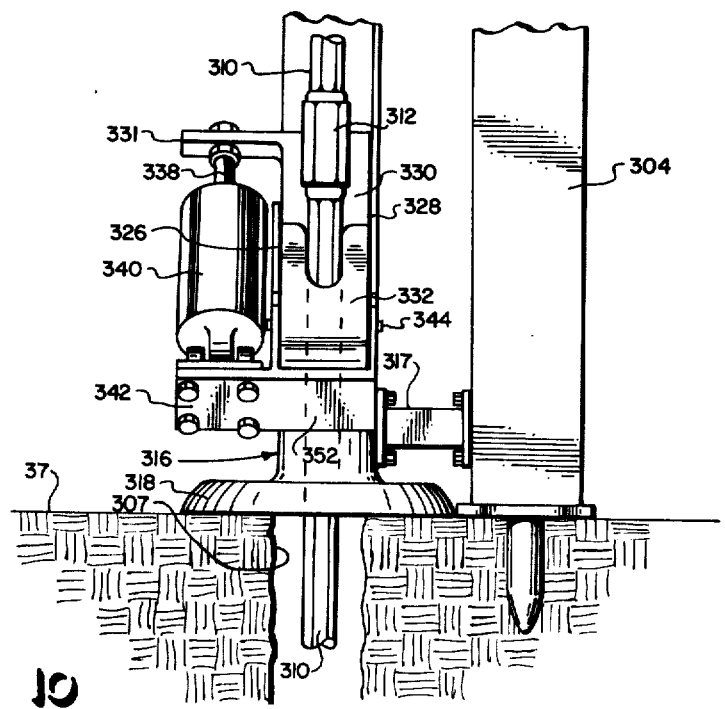
FIG. 10 is side elevation taken substantially from the line 10—10 of FIG. 9.
Figure 9:
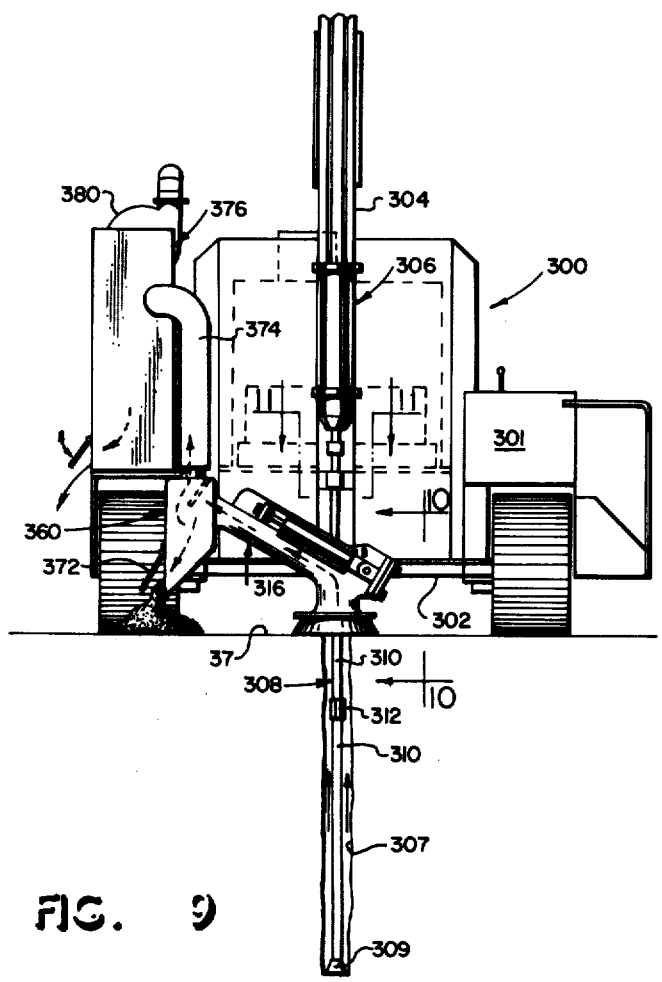
FIG. 9 is a front elevation of a portable earth drilling rig of the percussion type illustrating another embodiment of the dust conveying and collection system of the present invention.
Figure 11:
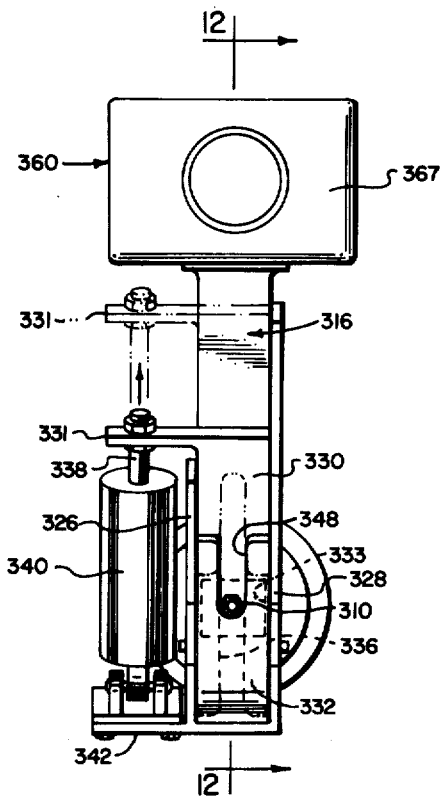
FIG. 11 is a detail plan view taken substantially from the line 11—11 of FIG. 9.
Figure 12:
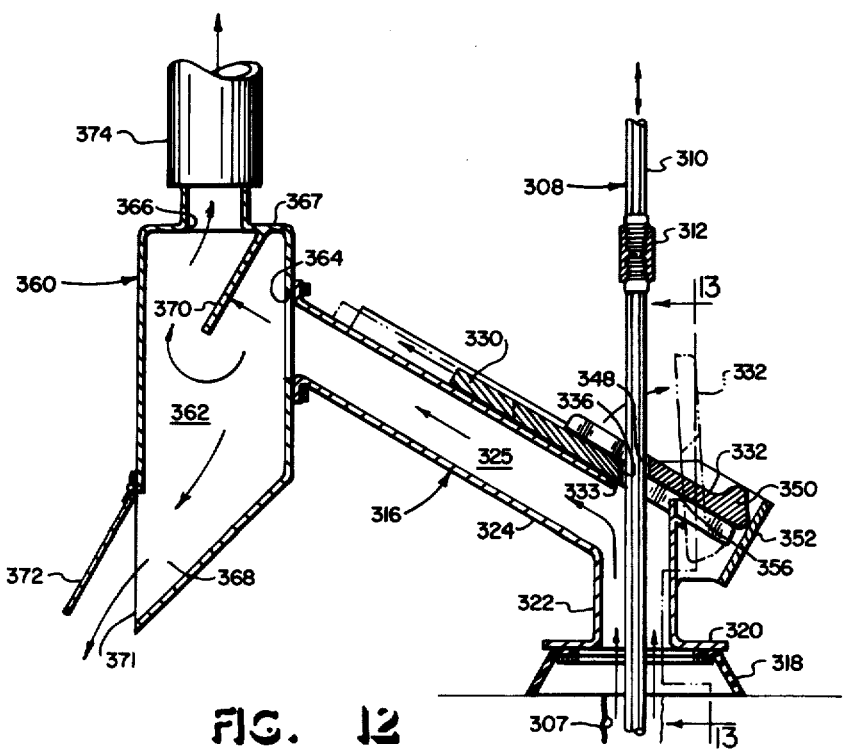
FIG. 12 is vertical elevation in section taken substantially from the line 12—12 of FIG. 11.

Another alternate embodiment of a dust conveying and collection system in accordance with the present invention is illustrated in FIGS. 9 through 13 of the drawings. Referring to FIGS. 9 and 10, in particular, there is illustrated an earth drilling rig, generally designated by the numeral 300, which is of the percussion type as opposed to the rotary type described hereinabove in connection with the previous drawing figures. The drilling rig 300 includes a crawler type undercarriage 302 on which may be mounted a mast or feed beam 304 adapted to be positioned in a wide variety of drilling attitudes for drilling vertical holes in the earth's surface 37 as well as holes at various angles. The drilling rig 300 includes a pressure fluid operated percussion drill hammer 306 adapted to deliver percussive blows to a drill stem 308. The drill stem 308 is normally made up of elongated hollow rod-like members 310 which are provided with external threads, not shown, on each end and are connected end to end by internally threaded coupling members 312 as illustrated in FIGS. 9, 10 and 12. The drilling rig 300 is also operable to provide bailing air to be conducted down through a passageway within the drill 306 and the drill stem 308 and through an internal bore in the respective drill rod members 310 from a source either on board the rig 300 or connected thereto. The drill rig 300 is adapted for drilling holes of nominal diameters up to 5 inches and does not produce the quantity of cuttings associated with operation of the larger rotary type drills. Accordingly, the drill rig 300 is provided with a dust conveying or lifting head generally designated by the numeral 316, which is adapted to be mounted on the base of the mast 304, as shown in FIG. 10, by means of suitable bracket 317.

Referring particularly to FIG. 12, the head 316 includes a frusto-conical shaped annular skirt portion 318 formed of a suitable resilient material and which is suitably fastened to a lower flange 320 of a vertically disposed tubular duct portion 322. The head 316 also includes a conveying duct portion 324 integrally formed with the duct portion 322 and disposed at an upwardly inclined angle with respect to the longitudinal axis of the duct portion 322 which is coincident with the drilling axis of the drill stem 308.

Figure 13:
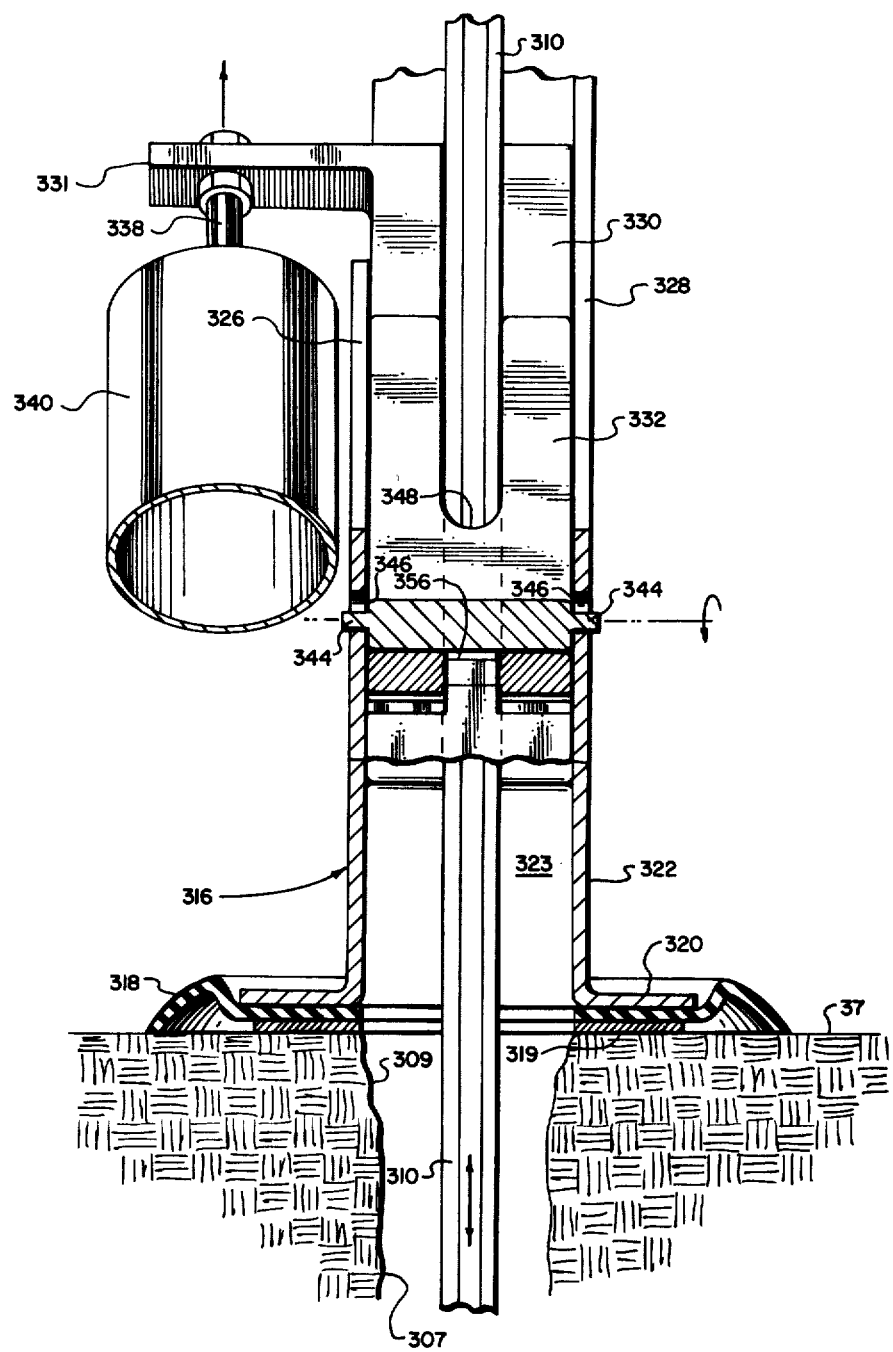
FIG. 13 is a detail section view showing the mounting arrangement of one of the sliding gate members of the head illustrated in FIGS. 9 through 12.

The upper external surface of the head 316 includes a substantially flat portion and is provided with a pair of spaced apart upstanding flanges 326 and 328, as shown in FIGS. 10, 11 and 13, forming a guide channel for a pair of movable gate members 330 and 332. The gate members 330 and 332 are adapted to form a relatively tight closure around the drill stem 308 during normal drilling operations, but are movable away from the drilling axis, as required, to permit movement of the couplings 312 through the head during drilling operations or when the drill stem is being removed from the drillhole 307. As shown in FIG. 12, the head 316 includes an opening 333 formed in the top of the duct portion 324 and which is substantially of the same diameter as the interior of the vertical tubular portion 322. The opening 333 may be smaller than the interior of the duct portion 322 but must be sufficiently large to permit the movement of the coupling 312 and the drill bit 309 through the head. Accordingly, in the closed position of the movable gate members 330 and 332 a flow deflecting surface is provided over the opening 333 to prevent the bailing air flow stream emanating from the drillhole 307 from exiting the head through the opening 333.

The gate member 330 is characterized as an elongated generally rectangular plate having a longitudinally formed slot 336 opening to one end of the plate and of a width slightly larger than the maximum diameter of the drill rod members 310. The end of the gate member 330 opposite the end in which the slot 336 is formed includes a laterally projecting boss 331 which is connected to the piston rod 338 of a pressure fluid cylinder actuator 340. The opposite end of the actuator 340 is suitably secured to a bracket portion 342 of the head 316. Accordingly, the member 330 is operable to be actuated by the cylinder actuator 340 to move to the position illustrated by the dotted lines in FIG. 11 to retract away from the opening 333.

Referring to FIGS. 12 and 13, the member 332 includes a pair of laterally projecting trunnion portions 344 which are adapted to be disposed in vertically elongated slots 346 formed in the respective flanges 326 and 328. The member 332 also includes an elongated slot 348 having a width essentially the same as the slot 336 and also opening to one end of the member 332. The opposite end of the member 332 includes an integral enlargement 350 acting as a counterweight which tends to pivot the member 332 into the position indicated by the dashed lines in FIG. 12.

In the closed position of the members 330 and 332 illustrated in FIGS. 10, 11 and 12 the gate member 330 is disposed under the gate member 332 and forces the member 332 into the position shown in FIG. 12 overlying the slot 336. When the member 332 is in the position shown in FIG. 12 the slot 348 overlies the solid portion of the member 330 so that only a substantially circular opening is presented for movement of the drill stem 308 through the head. As shown in FIGS. 12 and 13, the tubular portion 322 includes a vertically upwardly projecting tang 356 which is proportioned to be disposed in the slot 336 to substantially prevent the flow of bailing air out of the head 316 through the slot.

When a coupling member 312 approaches the head 316 during drilling operations the actuator 340 may be energized by the drill operator, who is normally standing at an operator's control panel 301, as shown in FIG. 9, and is in full view of the drill stem and the head. When the member 330 is actuated to slide away from the drill stem 308 the member 332 pivots into a substantially vertical position, indicated by the dashed lines in FIG. 12, to provide sufficient clearance to permit movement of coupling members and/or the drill bit through the head 316. The coupling formed by the trunnions 344 and the elongated slots 346 provides for the gate members 330 and 332 to move freely even if a considerable amount of drill cuttings become lodged between the members. Moreover, the coupling formed by the vertically disposed slots 346 permits the gate member 332 to rest against the transverse end wall or striker plate 352 to relieve the vibratory drilling forces from being imposed on the trunnions 344. When a coupling 312 has passed into or out of the head 316 the actuator 340 may then be energized to slide the member 330 back toward the striker plate 352 whereby the member 332 will be engaged by the distal end of the member 330 and pivoted back to the closed position illustrated in FIGS. 10, 11, and 12.

The gate members 330 and 332 form a major part of a flow deflecting surface in the interior flow channel 325 of the head 316 to deflect the flow of bailing air laden with drill cuttings and dust upwardly through the tubular duct portion 324 into a coarse drill cuttings separation enclosure generally designated by the numeral 360. The enclosure 360 includes an enlarged interior chamber 362 having an inlet opening 364 and a bailing air outlet opening 366 preferably formed in a top wall 367 of the enclosure. The chamber 362 includes a hopper portion 368 for collecting relatively coarse drill cuttings that are separated from the bailing air flow stream as it enters the chamber 362 and undergoes a substantial change in flow direction caused by the angularly disposed deflector plate 370. The deflector plate 370 is formed to be substantially perpendicular to the direction of flow of the bailing air flow stream as it enters the chamber 362 from the head 316. The enlarged volume of the chamber 362 together with the presence of the deflector plate 370 provides for separation of a substantial portion of the particulate material entrained in the bailing air flow due to a change of direction of the flow stream as well as a reduction in velocity resulting from the enlarged volumetric capacity of the chamber 362 as compared with the passageway 325. The enclosure 360 includes a door 372 which is operable to periodically swing open to allow cuttings collecting within the hopper portion 368 to flow out of the enclosure 360 onto the ground at a point remote from the drill hole 307, as illustrated in FIG. 9. The door 372 is normally biased in a closed position by the pressure differential within the chamber 362. The door 372 may be made of an elastic material similar to the drill cuttings discharge doors used on the enclosures 70 and 108 and the dust collection and filter unit 88.

The bailing air flow stream exiting the enclosure 360 through the opening 366 is conducted by way of a duct 374 to a collection and filter unit, generally designated by the numeral 376, as shown in FIG. 9. The filter unit 376 is preferably of a type similar to the filter unit 88 and may be sized according to the maximum air flow requirements of percussion type drill rigs, which flow requirements are generally less than the relatively larger rotary type rigs. Accordingly, the filter unit 376 may utilize either smaller separation and filter element chambers, for example, or a fewer number of filter element chambers. The filter unit 376 is also provided with a suction blower or pump, generally designated by the numeral 380 in FIG. 9, which may be similar to the pump 216 illustrated in FIG. 4. The suction pump 380 is also preferably provided with means for varying the volumetric capacity of the pump to provide for a negative pressure throughout the flow path of the bailing air flow stream at any point above the ground surface so that any leakage flow around the skirt 318, the gate members 330 and 332 or through the opening 371 in the enclosure 360 will be from the ambient exterior atmosphere into the bailing air flow stream.

FIG. 13 illustrates the operating position of the lifting head 316, which position is typical of the preferred operating position for all of the lifting head embodiments disclosed herein. As illustrated in FIG. 13, in operation the head 316 is forcibly engaged with the surface 37 such that a substantially rigid annular sealing flange 319 is forcibly engaged with the surface. In the embodiment of the lifting head illustrated in FIG. 13, the flange 319 suitably fastens the flexible collar 318 to the flange 320 by a plurality of threaded fasteners, not shown. Accordingly, in the operating position illustrated in FIG. 13 the flange 319 is in forcible sealing engagement with the earth and a secondary seal around the drillhole 307 is provided by the flexible collar or skirt 318.

As discussed previously herein, it is important that a material conveying or lifting head in accordance with the present invention be provided with an interior passageway along the duct portion 322, for example, and designated by the numeral 323 which is sufficiently larger than the diameter of the drillhole 207 to provide substantially unrestricted flow of the stream of bailing air and drill cuttings emanating from the hole. However, it is also important that the flow passage 323 not be enlarged to the extent that would cause a reduction in velocity of the flow stream or allow the drill cutting to separate within the duct portion 322 and collect around the periphery of the drillhole as is characteristic of most prior art drill cuttings conveying enclosures or hoods. Another problem in the art of drilling which determines to some extent the diameter or peripheral dimensions of the passage 232 pertains to the tendency for the bailing air flow stream to erode the sides of the drillhole 307 near the intersection with the earth's surface. This eroded portion of the drillhole 307 is indicated by the numeral 309 in FIG. 13. It is desirable to minimize the erosion of the drillhole at the earth's surface.

Accordingly, taking into consideration the above-mentioned factors, in proportioning the size of the interior flow passageway for a lifting head according to the present invention it is preferable to provide for the transverse diametral dimension of the flow passage 323 be approximately 2 inches greater than the nominal hole diameter for holes in the range of 3 to 4 inches in diameter. It is also preferable that the diameter of the flange 319 be approximately twice the diameter of the flow passage 323. If the diameter of the sealing flange 319 is not sufficient, erosion of the drillhole under the flange may occur and cause the hole to break out from under the flange. Where space permits the skirt 318 is proportioned to have an extended or displaced outer diameter of approximately 3 times the hole diameter, although this is not as critical as the provision of an adequate sealing flange 319.

If a lifting head in accordance with the present invention is to be used in substantially soft earth material such as sand or soft clay, as typified by the design of the lifting head 52, the interior flow passage of the head is proportioned in accordance with the aforementioned parameters with respect to drillhole size, and the diameter of the flange 54, for example, would also be approximately 3 times nominal hole diameter.

As will be recognized from the foregoing, the important factors in determining the cross sectional flow area of the interior passageways of a lifting head according to the present invention primarily deal with proportioning the passageways such that the flow of bailing air and entrained cutting is not impeded or choked, which will result in plugging of the flow path, but at the same time is only sufficiently larger than the drillhole as to permit this relatively unrestricted flow while maintaining substantial velocity of the flow stream.

Figure 14:
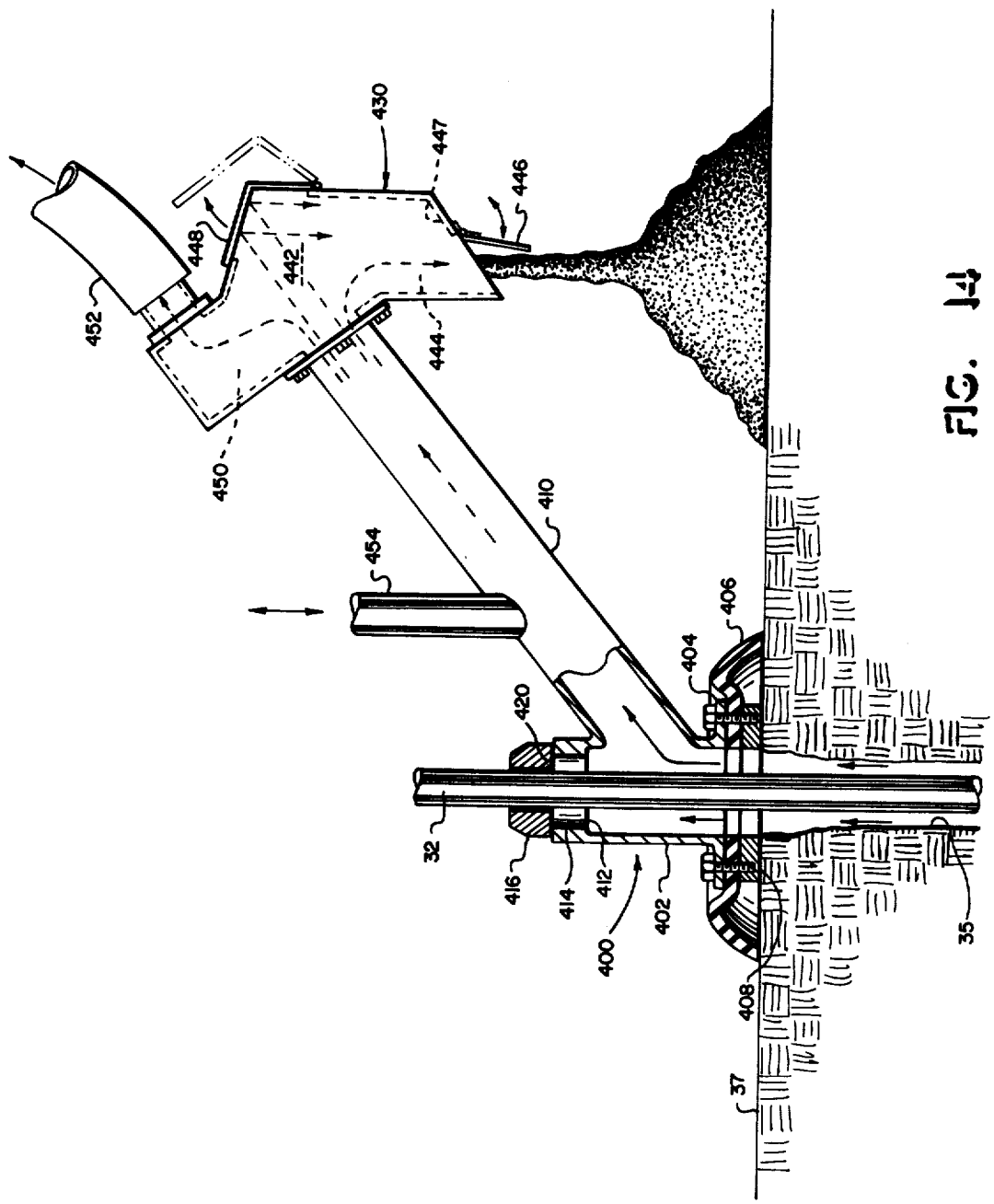
FIG. 14 is an elevation, partially sectioned, of another embodiment of a head and gravity separation chamber.

Referring to FIG. 14 of the drawings, a still further embodiment of a lifting head together with an inertial and gravity separation enclosure for coarse drill cuttings is illustrated. The lifting head illustrated in FIG. 14 is generally designated by the numeral 400 and includes a substantially vertical tubular portion 402 having a lower annular flange 404 to which is secured a flexible skirt or secondary sealing member 406. The skirt 406 is secured to the flange 404 by a lower rigid sealing flange 408 in a suitable manner. The lifting head 400 also includes a conveying duct portion 410 in communication with the tubular duct portion 402 and projecting upwardly at an angle of approximately 45 degrees with respect to the axis of the portion 402. The head 400 further includes an upper transverse end wall 412 having a bore 414 proportioned large enough to permit the drill stem 32 and bit 34 to be withdrawn through the head. The bore 414 is suitably sealed during drilling operations by the provision of a relatively heavy metal collar 416 disposed around the drill stem 32 in close fitting relationship thereto and normally resting on a surface 420 of the upper transverse wall portion 412. The collar 416 is provided to be of suitable weight such that under all drilling conditions the bailing air flow stream emanating from the drillhole 35 will not blow out through the bore 414. However, under normal operating conditions the differential pressure within the lifting head 400 would not provide any tendency for the collar 416 to be lifted off of the surface 420.

FIG. 14 also illustrates a modified embodiment of a coarse drill cuttings separation enclosure generally designated by the numeral 430 and which is suitably connected to the duct portion 410. The enclosure 430 is similar in some respect to the enclosure 360 and is characterized in having an enlarged interior chamber 422 in communication with the flow passage within the duct portion 410. The chamber 442 includes a vertically depending portion 444 forming a hopper for collection of coarse drill cuttings and the like. The enclosure 430 includes a door 446 suitably fastened to a sloping bottom wall portion 447 of the enclosure. The door 446 is preferably made of a resilient material and is normally biased in the closed position but under the urging of the weight of material collecting in the hopper portion 444 is operable to open to discharge material from the chamber 422. In operation with the filter unit 88 or a similar unit the door 446 is also held closed by the differential pressure between the chamber 442 and the exterior of the enclosure 430. The enclosure 430 also includes a door 448 forming a portion of a sloping top wall and a substantially vertical side wall of the enclosure and which is provided primarily for clean out operations, if needed. The enclosure 430 further includes an arm 450 of the chamber 422 which is laterally spaced from the longitudinal axis of the duct portion 410 and is in communication with an outlet duct 452 leading to a filter unit, not shown, such as the filter unit 88.

The arrangement of the chamber 442 including the hopper portion 444 and the laterally spaced arm 450 provides for superior separation of the coarse drill cuttings from the flow stream being conducted through the duct portion 410. As the flow enters the chamber 442 it impinges the top and sidewalls of the enclosure including the door 448 and undergoes change in direction which separates substantially all of the relatively coarse drill cuttings which collect in the hopper portion 444. The heaviest cuttings may separate primarily due to gravity while intermediate size cuttings impinge the walls of the enclosure and are deflected into the hopper portion 444. It is indicated that the bailing air flow entering the chamber 442 and which is required to undergo at least two 90 degree changes in flow direction causes a substantial separation of cuttings leaving only relatively fine particles remaining in the flow stream. As shown in FIG. 14, the head 400 includes a vertically extending member 454 which may be suitably connected to a piston and cylinder type actuator for extending the head into engagement with the ground surface 37 as shown, and in a manner similar to the manner in which the heads 262 and 100 are mounted. The head 400 is adapted to operate with substantially tubular drill strings such as the drill stem 32 although it could be adapted to operate with percussion type drill stems also.

Referring to FIG. 15, a further embodiment of a conveying head and apparatus for separating relatively coarse drill cuttings is ilustrated mounted on the deck plate 38. The apparatus illustrated in FIG. 15 includes a conveying head generally designated by the numeral 500 including a vertically depending tubular portion 502 in which is telescopingly fitted a tubular member 504 adapted to be slidably moved between an extended position in engagement with the ground surface and a retracted position for transport of the drill rig. The head member 504 includes a lower annular flange 506 and a flexible skirt or seal member 508 fixed thereto in a manner similar to the arrangement of the head 100 illustrated in FIG. 3.

The extensible and retractable head member 504 is suitably connected to a U-shaped bracket 510 as shown and having its base portion connected to the distal end of a piston rod 512 of a pressure fluid cylinder actuator 514 mounted on the deck plate 38. The actuator 514 is adapted to be connected to the conduits 122 and 124 in a manner similar to the arrangement illustrated in FIG. 3. Accordingly the head member 504 may be extended and retracted in accordance with the provision of bailing air to the drill stem 32.

The arrangement illustrated in FIG. 15 includes an enclosure 520 suitably mounted on the underside of the deck plate 38 and providing an interior chamber for receiving the bailing air flow stream flowing upwardly through the head 500. The enclosure 520 includes an elongated duct portion 522 having an interior chamber 524 for receiving the bailing air flow stream together with substantially all of the entrained drill cuttings. The lower portion of the duct 522 is formed as a trough in which is rotatably mounted an elongated helical screw type conveyor 526 mounted on suitable bearings at each end of the duct and adapted to be rotated by a pressure fluid motor 528 mounted on the duct and operably connected to the conveyor screw. The duct 522 also includes a hopper portion, designated by the numeral 530, and disposed at a point remote from the drillhole for discharging cuttings conveyed by the screw 526 from the enclosure. The hopper portion 530 is also provided with a flexible hinged door 532 which is operable to open under the weight of cuttings being discharged into the hopper portion when the pressure differential between the interior chamber 524 and the ambient atmosphere is reduced sufficiently. The duct 522 is also adapted to be in flow communication with the duct 86 for conducting the bailing air flow stream to the fine drill cuttings collection and separation unit.

As illustrated in FIG. 15, the bailing air flow stream emanating from the drillhole will be conveyed upwardly into the enclosure portion 520 and redirected into the duct 522 through the opening 534 whereby the enlarged volume of the chamber 524 will permit a reduction in the flow velocity sufficient to permit separation of relatively coarse drill cuttings. The separated cuttings are conveniently conveyed along the duct 522 by the conveyor screw 526 to the hopper 530 for final discharge from the apparatus in accordance with the teachings of the present invention. The arrangement illustrated in FIG. 15 is advantageous in that the screw type conveyor may be conveniently disposed within a duct or other suitable enclosure with minimum requirements for sealing the conveying mechanism from ambient atmosphere. Accordingly, there is virtually no leakage of atmospheric air into the bailing air flow stream and, moreover, the screw type conveyor is an efficient and mechanically uncomplicated means for conveying coarse drill cuttings separated from the flow stream to a final discharge point remote from the drillhole.

A preferred mode of operation of the total conveying and collection system of the present invention comprises the steps of extending the lifting head into sealing engagement with the ground surface adjacent the drillhole prior to operation of the drilling rig to commence drilling. Extension of the head as well as start up of the suction pump on the filter unit such as the pump 216, for example, could be coincident with the provision of bailing air down through the drill stem into the drillhole in accordance with the control system described herein. The speed of the motor 224 would be either preset in accordance with known bailing air flow requirements or controlled by the drill rig operator to maintain a flow rate which would provide a negative pressure within the passageways of the conveying and collection system. Accordingly, there would be no leakage of dust laden bailing air out of any of the seal points of the system of the present invention. The reverse jet cleaning system would be set to provide periodic pulses of reverse jet cleaning air to the filter elements, which pulses would provide momentary pressure increases in the system sufficient to allow the discharge doors on the separation chambers to momentarily open to discharge collected material. In actual operation, it has been observed that the change in pressure within the system to allow the doors to open is so brief that as the coarse cuttings are being discharged from, for example, the chamber 71 or the hoppers 368, 444 or 530 that air flow is still substantially from the exterior of the enclosures into the enclosures. This action provides a further scrubbing or cleaning of fine dust from the coarse particles and prevents dust from emanating from the coarse material collection chambers.

In normal operation, the discharge doors on the filter unit 88 do not open until the system is shut down upon completion of the drillhole or for changing a drill but unless very substantial quantities of dust built up in the respective hoppers.

It has been observed that a conveying and collection system for particulate material such as drill cuttings or the like in accordance with the teachings of the present invention is operable to separate approximately 75 to 85 percent of the total material ejected from the drillhole in the coarse drill cuttings separation enclosures such as the enclosures 70, 108, 360, 430 or 520. The 15 to 25 percent of the total material which is conveyed on into the final collection and filter unit, such as the filter unit 88, is conveyed under conditions which provide for a material weight to air flow volume ratio which is approximately equivalent to the material to bailing air flow volume ratios of prior art total collection systems which convey all of the material to a point remote from the drillhole by utilizing substantial volumes of makeup air injected into the bailing air flow stream by one means or another. In other words, as pointed out hereinabove, prior art total collection systems are required to operate with four to six times the bailing air flow volume being conducted down through the drill stem as the total air flow which must be handled by the collection and filtration unit. However, by effectively utilizing the bailing air flow from the drillhole and also separating 80 percent of the material in the coarse drill cuttings separation enclosures the total air flow handled by the collection and filter unit is less than prior art systems, the suction blower requirements are reduced, and the size and/or number of impingement type filters is less than heretofore required.

Those skilled in the art of pneumatic conveying systems will recognize the advantages of the present invention wherein a major portion of the material entrained in the bailing air flow stream is removed at a point remote from the drillhole utilizing the energy of the bailing air flow together with mechanical conveying means of only minimal power requirements and whereby the power requirements of the entire system are substantially reduced compared with heretofore known conveying and collection systems.

Not only are the total air flow requirements reduced, and in accordance therewith the size and complexity of the conveying system, but other problems attendant with prior art systems are also alleviated such as the tendency for plugging of the conveying ducts and overloading of the final impingement type filters.

In accordance with the system of the present invention of the additional 15 to 25 percent of the material which is conveyed or into the filter unit such as the filter unit 88 a total of 20 to 30 percent of that quantity is normally separated in the separation chamber 162. Accordingly, only 7 to 16 percent of the total material ejected from the drillhole is normally required to be separated from the bailing air flow stream by the impingement type filters. Those skilled in the art of air filtration will recognize that a system in accordance with the present invention is highly efficient and substantially reduces the loading of impingement type filters.

As will be appreciated from the foregoing the present invention significantly improves the overall process of conveying and collecting substantially the full range of particulate material that is normally generated in earth drilling operations and wherein such material is evacuated from the drillhole by a gaseous medium such as compressed air. Although, only two embodiments of earth drilling equipment have been illustrated in connection with the various embodiments of the present invention it will be recognized by those skilled in the art that the present invention may be used in connection with virtually all sizes and types of earth drilling equipment wherein the drill cuttings are evacuated from the drillhole by a fluid stream of bailing or flushing air. The present invention is particularly adapted to utilize the energy of a bailing air flow stream to convey the drill cuttings beyond the entrance to the drillhole through an improved conveying head disposed around the drillhole entrance and sized to maintain the bailing air flow velocity and energy level as high as possible to convey the cuttings away from the immediate vicinity of the drillhole.

Those skilled in the art will appreciate that various features, characteristics and advantages of the present invention have been set forth herein or are readily realizable from the detailed description of the preferred embodiments. However, the disclosure is illustrative only and various changes may be made in regard to the details of arrangement, size and shape of the components, while utilizing the principles of the present invention and falling within the scope and spirit of the invention as expressed in the following claims.

What I claim is:

1. A head adapted for use on a portable earth drilling rig for conveying particulate material entrained in a bailing air flow stream emanating from a drillhole, said head comprising:
   means forming an enclosure surrounding said drillhole and including a lower peripheral edge adapted to be in substantial sealing engagement with the ground surface; and
   means forming an opening in said head for a drill stem projecting through said hood and into said drillhole, said means forming an opening includes a first member having a slot adapted to be in close fitting relationship to said drill stem, a second member including a slot adapted to be in close fitting relationship around said drill stem, one of said members being adapted to overlie the other member to form a closure over a major portion of said slots except around said drill stem to substantially prevent the flow of air into or out said head, said members being movable away from said drill stem to permit enlarged portions of said drill stem to be passed through said head.

2. The invention set forth in claim 1 wherein:
   said first member includes a plate slidably disposed on said head for movement between open and closed positions, and said head includes means for mounting said second member in such a way as to permit said second member to move to an open position enlarging the opening in said head in response to movement of said first member away from said drill stem.

3. The invention set forth in claim 2 wherein:
   said second member includes means normally biasing said second member in the open position.

4. The invention set forth in claim 3 wherein:
   said means normally biasing said second member in the open position includes counterweight means on said second member.

5. The invention set forth in claim 4 together with:
   surface means on said head engageable with said counterweight means when said second member is in the closed position.

6. The invention set forth in claim 2 wherein:
   said head includes power actuator means for moving said first member between open and closed positions with respect to said drill stem.

7. The invention set forth in claim 1 wherein:
   said hood includes a projection interposed in said slot in one of said members to substantially prevent the flow of air through said slot into or out of said head.

8. A method for separating particulate material from an air flow stream emanating from a drillhole comprising:
   providing enclosed means for receiving said flow stream and conducting said flow stream to a point removed from the vicinity of said drillhole, said enclosed means including,
   means for collecting material from said flow stream and discharge means responsive to the pressure differential within said enclosed means to retain said material in said enclosed means,
   providing suction pump means for receiving said flow stream and maintaining a pressure in said enclosed means less than atmospheric pressure; and
   periodically increasing the fluid pressure in said enclosed means to cause said discharge means to discharge material from said enclosed means which has been separated from said flow stream.

9. The invention set forth in claim 8 wherein:
   said enclosed means includes means for providing a fluid jet directed generally opposite to the flow direction of said flow stream, and operating said fluid jet means periodically for a brief period to provide a pressure pulse sufficient to cause said discharge means to discharge said material.

10. Apparatus for conveying and collecting particulate material entrained in a moving air stream emanating from a drillhole comprising:
    means for receiving said air stream and for separating relatively coarse material from finer material at a point removed from the vicinity of said drillhole utilizing the inertia of said coarse material and the velocity of said air stream entering said receiving means, said receiving means including a material lifting head including means forming a seal between said receiving means and the ground surface around said drillhole and means for deflecting said air stream to redirect the flow of said air stream and said particulate material without materially reducing the momentum of said coarse material;
    means for collecting said finer material from said air stream without materially interfering with the separation of said coarse material; and means forming an enclosure in flow receiving communication with said receiving means and defining a chamber for separating said coarse material from said air stream by at least partially utilizing gravitational forces acting on said coarse material, said enclosure being disposed in the flow path of said air stream between said head and said means for collecting said finer material, said chamber including a material receiving hopper and a flow stream discharge portion disposed laterally spaced from and above said hopper, and means for discharging said material from said hopper in response to a change in the pressure within said hopper with respect to the ambient atmospheric pressure.

11. The apparatus set forth in claim 10 wherein:

said means for discharging said material includes door means in said hopper responsive to the fluid pressure in said hopper to open momentarily to discharge said material from said hopper.

12. Apparatus for conveying and collecting particulate material entrained in a moving air stream emanating from a drillhole comprising:

means for receiving said air stream and for separating relatively coarse material from finer material at a point removed from the vicinity of said drillhole utilizing the inertia of said coarse material and the velocity of said air stream entering said receiving means, said receiving means including a material lifting head including means forming a seal between said receiving means and the ground surface around said drillhole and means for deflecting said air stream to redirect the flow of said air stream and said particulate material without materially reducing the momentum of said coarse material;

means for collecting said finer material from said air stream without materially interfering with the separation of said coarse material;

means forming an enclosure in flow receiving communication with said receiving means and defining a chamber for separating said coarse material from said air stream by at least partially utilizing gravitational forces acting on said coarse material, said means forming said enclosure being disposed in the flow path of said air stream between said head and said means for collecting said finer material; and mechanical conveying means disposed within said means forming said enclosure and adapted to convey said coarse material to conveyor discharge means substantially remote from the vicinity of said drillhole.

13. The apparatus set forth in claim 12 wherein:

said mechanical conveying means comprises an endless conveyor belt disposed within said chamber and adjacent to said head for conveying said material to a point remote from the vicinity of said drillhole.

14. The apparatus set forth in claim 12 wherein:

said mechanical conveying means comprises an elongated screw conveyor disposed within said chamber and adjacent to said head for conveying said material to a point remote from the vicinity of said drillhole.

15. Apparatus for conveying and collecting particulate material entrained in a moving air stream emanating from a drillhole comprising:

means for receiving said air stream and for separating relatively coarse material from finer material at a point removed from the vicinity of said drillhole utilizing the inertia of said coarse material and the velocity of said air stream entering said receiving means, said receiving means including a material lifting head including means forming a seal between said receiving means and the ground surface around said drillhole, and means for deflecting said air stream to redirect the flow of said air stream and said particulate material without materially reducing the momentum of said coarse material;

means for collecting said finer material from said air stream without materially interfering with the separation of said coarse material; and means for mounting said head on a drill rig, said mounting means including power operated means for moving said head between an extended position wherein said means forming said seal is in engagement with the ground surface around said drillhole and a retracted position, said power operated means including means for yieldably biasing said head in engagement with the ground surface around said drillhole.

16. The apparatus set forth in claim 15 together with:

a hollow drill stem adapted to be operatively associated with said drill rig;

a source of air pressure;

means for conducting pressure air from said source down through said drill stem to provide cuttings bailing air to said drillhole;

control means responsive to the supplying of bailing air to said drill stem to cause said power operated means to extend said head into engagement with the ground surface.

17. Apparatus for conveying and collecting particulate material entrained in a moving air stream emanating from a drillhole comprising:

means for receiving said air stream and for separating releatively coarse material from finer material at a point removed from the vicinity of said drillhole utilizing the inertia of said coarse material and the velocity of said air stream entering said receiving means, said receiving means including a material lifting head including means forming a seal between said receiving means and the ground surface around said drillhole, and means for deflecting said air stream to redirect the flow of said air stream and said particulate material without materially reducing the momentum of said coarse material, and means for collecting said finer material from said air stream without materially interfering with the separation of said coarse material including a housing defining a plurality of chambers including an air inlet chamber in flow communication with at least one filter element chamber, an inlet opening into said inlet chamber, a transverse wall surface disposed at one end of said inlet chamber opposite said inlet opening and defining, in part, an enlarged area of said inlet chamber comprising a gravity separation chamber for relatively coarse material entrained in said air stream entering said inlet chamber, porous media filter element means disposed in said filter element chamber, and a clean air outlet chamber in flow communication with said filter element means.

18. The apparatus set forth in claim 17 wherein:

said housing includes a plurality of filter element chambers each including respective inlet opening means formed in a longitudinal wall of said inlet chamber.

19. Apparatus for conveying and collecting particulate material entrained in a moving air stream emanating from a drillhole comprising:
- means for receiving said air stream and for separating relatively coarse material from finer material at a point removed from the vicinity of said drillhole utilizing the inertia of said coarse material and the velocity of said air stream entering said receiving means, said receiving means including a material lifting head including means forming a seal between said receiving means and the ground surface around said drillhole, and means for deflecting said air stream to redirect the flow of said air stream and said particulate material without materially reducing the momentum of said coarse material, and means for collecting said finer material from said air stream without materially interfering with the separation of said coarse material including a housing including an air inlet chamber, an air inlet opening into said inlet chamber, wall means in said housing defining a filter element chamber for enclosing a substantially cylindrical impingement filter element, an opening between said inlet chamber and said filter element chamber for admitting a flow stream of air having said finer material entrained therewith into said filter element chamber, said wall means being curved to cause said air entering said filter element chamber to flow around said filter element in a vortiginous manner to provide for inertial separation of material.

20. The apparatus set forth in claim 19 wherein:
- said housing includes a plurality of filter elements disposed in a plurality of separate filter element chambers each in flow communication with said inlet chamber.

21. In combination with an earth drilling rig including a drill stem and means for providing drill cuttings bailing air to said drill stem, apparatus for conveying and collecting particulate material generated by said drilling rig in forming a drillhole wherein the particulate material comprises coarse and fine drill cuttings which are ejected from the drillhole by a bailing air flow stream, said apparatus including:
- means for receiving said material being ejected from said drillhole comprising a material conveying head including means adapted to be disposed around said drillhole in substantial sealing engagement with the earth's surface;
- an enclosure in flow receiving communication with said head and defining a chamber for separating coarse drill cuttings from said flow stream by utilizing gravitational and inertial forces acting on said material, said enclosure including means for discharging said coarse drill cuttings from said enclosure at a point remote from said drillhole;
- means in flow receiving communication with said enclosure for collecting said fine cuttings;
- suction producing pump means including an inlet port in flow receiving communication with said means for collecting fine cuttings for inducing said air flow stream to flow through said enclosure and said means for collecting said fine cuttings without injection of any substantial quantity of air from a source other than said drillhole; and
- means for varying the volumetric displacement of said pump means for controlling the pressure of said air flow stream within said apparatus at least between said head and the inlet of said pump means, said means for varying the volumetric displacement of said pump means including a pressure fluid operated drive motor and control valve means operable to vary the speed of said drive motor by varying the quantity of pressure fluid conducted to said drive motor.

22. A head adapted for use on a portable earth drilling rig for conveying particulate material entrained in a bailing air flow stream emanating from a drillhole, said head comprising:
- means forming an enclosure surrounding said drillhole and including a lower peripheral edge;
- means forming an opening in said head for a drill stem projecting through said head and into said drillhole;
- flow deflecting surface means disposed in the flow path of said bailing air emanating from said drillhole for deflecting said flow stream and said particulate material into conveying duct means connected to said head without permitting a significant amount of said particulate material to collect on the ground surface between said drillhole and said lower peripheral edge of said head;
- pressure fluid operated actuating means connected to said head for moving said head between an extended position toward the ground surface and a retracted position; and
- control means associated with said actuating means including a control valve operable to supply pressure fluid to said actuating means to extend said head in response to supplying bailing air from said drilling rig to convey said particulate material out of said drillhole.

23. The invention set forth in claim 22 wherein:
- said actuating means comprises linear reciprocable cylinder and piston means operable to yieldably bias said head into engagement with the ground surface around said drillhole under the urging of pressure fluid supplied to said cylinder and piston means.

24. A head adapted for use on a portable earth drilling rig for conveying particulate material entrained in a bailing air flow stream emanating from a drillhole, said head comprising:
- means forming an enclosure surrounding said drillhole and including a lower peripheral edge;
- means forming an opening in said head for a drill stem projecting through said head and into said drillhole;
- flow deflecting surface means disposed in the flow path of said flow stream emanating from said drillhole for deflecting said flow stream and said particulate material into conveying duct means connected to said head without permitting a significant amount of said particulate material to collect on the ground surface between said drillhole and said lower peripheral edge of said head;
- means connected to said head for moving said head between ann extended position toward the ground surface and a retracted position, said means for moving said head between said extended and retracted positions including actuator means; and
- a bracket pivotally connected to said head and to said actuator means and operable to provide movement of said head with respect to said actuator means about two mutually perpendicular pivot axes.

25. The invention set forth in claim 24 wherein:

said head includes a lower peripheral flange portion including means forming said peripheral edge; and, a member forming an extensible tubular enclosure and interconnecting said flange portion and said conveying duct means.

26. The invention set forth in claim 25 wherein:

said member comprises a spirally coiled flat sided band adapted to be extended to form a tubular enclosure for conducting said flow stream.

27. Apparatus for use on a portable earth drilling rig for conveying drill cuttings entrained in a bailing air flow stream emanating from a drillhole away from the immediate vicinity of said drillhole and separating relatively coarse cuttings from said flow stream, said apparatus comprising:

a conveying head adapted to be disposed around a drill stem at the entrance to said drillhole and including means forming a passage for receiving and conveying said flow stream away from drillhole without permitting a significant deposit of drill cuttings on the surface around said drillhole;

means forming an enclosure in flow receiving communication with said head and forming an enlarged chamber for separating coarse drill cuttings from said flow stream, said means forming said enclosure including flow deflecting surface means interposed in the flow path of said flow stream for deflecting drill cuttings entering said enclosure, and a hopper portion for receiving coarse drilling cuttings separated from said flow stream by impingement against said flow deflecting surface means, said means forming said enclosure being connected to said head by elongated conveying duct means in flow receiving communication with said passage and adapted to support said means forming said enclosure at a point remote from said drillhole; and means for discharging said coarse drill cuttings from said chamber at a point remote from said drillhole.

28. Apparatus for use on a portable earth drilling rig for conveying drill cuttings entrained in a bailing air flow stream emanating from a drillhole away from the immediate vicinity of said drillhole and separating relatively coarse cuttings from said flow stream, said apparatus comprising:

a conveying head adapted to be disposed around a drill stem at the entrance to said drillhole and including means forming a passage for receiving and conveying said flow stream away from said drillhole without permitting a significant deposit of drill cuttings on the ground surface around said drillhole;

means forming an enclosure in flow receiving communication with said head and forming an enlarged chamber for separating coarse drill cuttings from said flow stream, said means forming said enclosure including mechanical conveying means for conveying said coarse drill cuttings separated from said flow stream in said chamber to a point remote from said drillhole; and means for discharging said coarse drill cuttings from said chamber at a point remote from said drillhole.

29. The invention set forth in claim 28 wherein:

said mechanical conveying means includes an endless conveyor belt including a portion disposed in said chamber.

30. The invention set forth in claim 28 wherein:

said mechanical conveying means includes an elongated screw conveyor including a portion disposed in said chamber.

31. Apparatus for conveying and collecting particulate material entrained in a moving air stream emanating from a drillhole comprising:

means for receiving said air stream and for separating relatively coarse material from finer material at a point removed from the vicinity of said drillhole utilizing the inertia of said coarse material and the velocity of said air stream entering said receiving means, said means for receiving said air stream including a material lifting head including means forming a seal between said receiving means and the ground surface around said drill hole, and means for deflecting said air stream to redirect the flow of said air stream and said particulate material without materially reducing the momentum of said coarse material, said head including a sealing flange engageable with the ground surface around said drillhole, and a telescoping duct portion connected to said flange and to conveying duct means for said air stream, means for mounting said head on a drill rig including power operated means comprising flexible cable means connected to said telescoping duct portion and to rotatable shaft means for winding and unwinding said cable means and a motor drivably connected to said shaft means; and means for collecting said finer material from said air stream without materially interfering with the separation of said coarse material.

32. A method for separating particulate material from an air flow stream emanating from a drillhole comprising:

providing means for receiving said flow stream and conducting said flow stream to a point removed from the vicinity of said drillhole, providing mechanical conveying means in said receiving means;

providing means for collecting finer material from said flow stream and being in flow communication with said receiving means;

passing said flow stream through said receiving means and separating relatively coarse material from said flow stream at a point removed from the vicinity of said drillhole utilizing the inertia of said coarse material as provided by said flow stream emanating from said drillhole; and mechanically conveying said coarse material away from said drillhole after separation from said flow stream.

33. Apparatus for conveying and collecting particulate material entrained in a moving air stream emanating from a drillhole comprising:

means for receiving said air stream and for separating relatively coarse material from finer material at a point removed from the vicinity of said drillhole utilizing the inertia of said coarse material and the velocity of said air stream entering said receiving means, said receiving means including a head member adapted to be disposed around the mouth of said drillhole and forming passage and means for directing the flow of said air stream and said particulate material without materially reducing the momentum of said coarse material;

means for collecting said finer material from said air stream without materially interfering with the separation of said coarse material; and means forming an enclosure in flow receiving communication with said passage means in said head member and defining a chamber for separating said coarse material from said air stream by at least partially utilizing gravitational forces acting on said coarse material, said chamber including a material receiving hopper portion and a flow stream discharge portion, and means for discharging said material from said hopper portion in response to a change in the pressure within said hopper portion with respect to ambient atmospheric pressure.

34. Apparatus for use on a portable earth drilling rig for conveying drill cuttings entrained in a bailing air flow stream emanating from a drillhole away from the immediate vicinity of said drillhole and separating relatively coarse cuttings from said flow stream, said apparatus comprising:

a head adapted to be disposed around a drill stem at the mouth of said drillhole and including means forming a passage for receiving and conveying said flow stream away from drillhole without permitting a significant deposit of drill cuttings on the ground surface around said drillhole;

means forming an enclosure in flow receiving communication with said head and including a chamber for separating coarse drill cuttings from said flow stream, said means forming said enclosure including a hopper portion for receiving coarse drilling cuttings separated from said flow stream, said means forming said enclosure being connected to said head by elongated conveying duct means in flow receiving communication with said passage and adapted to support said means forming said enclosure with respect to said head; and means for discharging said coarse drill cuttings from said chamber at a point away from the immediate vicinity of said drillhole.

35. The invention set forth in claim 28 or 34 wherein:
said means for discharging said coarse drill cuttings includes door means on said enclosure operable to open periodically for discharging drill cuttings from said enclosure at a point remote from said drillhole.

36. Apparatus for use on an earth drill rig for conveying and collecting drill cuttings comprising coarse and fine particulate material generated during the formation of a generally downwardly directed drillhole, said drill cuttings being entrained in a bailing air flow stream emanating from the bottom of said drillhole, said apparatus comprising:

a head including means engageable with the ground surface around said drillhole to form a substantial seal between said head and said ground surface, and means forming a substantial seal between said head and a drill stem extending through said head, said head defining an interior passageway only slightly larger in diameter than the diameter of said drillhole, and flow deflecting surface means in said head for guiding said flow stream emanating from said drillhole without materially reducing the momentum of said coarse material;

means for mounting said head on said drill rig;

means forming an enclosure disposed at a point removed from the immediate vicinity of said drillhole including a duct portion in communication with said passageway and including means for separating said coarse material from said fine material utilizing the inertia of said coarse material and the velocity of said flow stream, said means forming said enclosure defining a chamber for collecting said coarse material by at least partially utilizing gravitational forces acting on said coarse material as said coarse material enters said chamber;

means in communication with said chamber for separating and collecting substantially all of said fine material from said flow stream; and suction producing pump means for maintaining the velocity of said flow stream emanating from said drillhole sufficient to carry substantially all of said coarse and fine material into said chamber utilizing the flow stream of air from said drillhole, said pump means being required to operate at a nominal volumetric inlet flow capacity less than approximately two times the volumetric flow rate of bailing air emanating from said drillhole.

37. The apparatus set forth in claim 36 wherein:
said chamber includes a material receiving hopper and a flow stream discharge portion disposed laterally spaced from and above said hopper.

38. The apparatus set forth in claim 36 wherein:
said flow deflecting surface means is disposed at an angle with respect to the longitudinal axis of said drillhole so as to direct said flow stream emanating from said drillhole in an upwardly inclined direction into a conveying duct interconnecting said head and said means forming said enclosure.

39. The apparatus set forth in claim 36 wherein:
said flow deflecting surface means is disposed substantially perpendicular to the longitudinal axis of said drillhole so as to direct said flow stream emanating from said drillhole in a substantially horizontal direction into said means forming said enclosure.

40. The apparatus set forth in claim 36 wherein:
said apparatus includes means for mounting said head on said drill rig, said mounting means including power operated means for moving said head between an extended position wherein said seal forming means is in engagement with the ground surface around said drillhole and a retracted position.

41. The apparatus set forth in claim 40 wherein:
said power operated means includes pressure fluid actuated piston and cylinder means.

42. The apparatus set forth in claim 40 wherein:
said head includes a sealing flange engageable with the ground surface around said drill hole, and a telescoping duct portion connected to said flange and to conveying duct means for said flow stream.

43. The apparatus set forth in claim 42 wherein :
said telescoping duct portion includes a spiral coiled band.

44. The apparatus set forth in claim 42 wherein:
said mounting means includes a bracket connected to said head and to said power operated means and operable to permit universal movement of said flange with respect to said drill rig.

45. The apparatus set forth in claim 36 wherein:
said pump means includes motor means for driving said pump means and said pump means includes control means for controlling the inlet flow capacity of said pump means to maintain a pressure in said passageway less than the ambient atmospheric pressure.

46. The invention set forth in claim 36 wherein:
said apparatus includes actuator means interconnecting said head and said drilling rig and operable to move said head between an extended position in substantial sealing engagement with the ground surface around said drillhole and a retracted position.

47. The invention set forth in claim 46 wherein:
said actuator means includes control means operable to extend and retract said head in response to starting and stopping the flow of bailing air to said drill stem, respectively.

48. The invention set forth in claim 36 wherein:
said apparatus includes means for operating said pump means including control means for starting and stopping said pump means in response to starting and stopping the flow of bailing air to said drill stem, respectively.

49. The apparatus set forth in claim 36 wherein:
the volumetric inlet flow capacity of said pump means is required to be 1.0 to 1.5 times the volumetric flow rate of bailing air emanating from said drillhole.

50. A method for separating particulate material comprising coarse and fine drill cuttings from an air flow stream emanating from a drillhole comprising:
providing means for receiving said flow stream and conducting said flow stream to a point removed from the vicinity of said drillhole;
providing means for collecting substantially all of the fine cuttings from said flow stream and being in flow communication with said receiving means;
providing suction pump means for receiving said flow stream from said means for collecting said fine cuttings;
passing said flow stream through said receiving means and separating relatively coarse cuttings from said flow stream at a point removed from the vicinity of said drillhole utilizing the inertia of said coarse cuttings as provided by said bailing air flow stream emanating from said drillhole; and
passing said flow stream through said means for collecting fine cuttings by operating said pump means at a volumetric flow capacity of less than two times the volumetric flow rate of bailing air emanating from said drillhole.

51. The method set forth in claim 50 together with the step of:
providing flow deflecting surface means interposed in the path of said flow stream emanating from said drillhole; and
redirecting the flow stream emanating from said drillhole by impinging said flow stream against said surface means.

52. Apparatus for use on an earth drill rig for conveying and collecting drill cuttings comprising coarse and fine particulate material generated during the formation of a generally downwardly directed drillhole, said drill cuttings comprising particle sizes ranging from a maximum dimension of several millimeters to 4 to 5 microns and being entrained in a flow stream utilizing substantially only bailing air emanating from the bottom of said drillhole, said apparatus comprising:
a head including means defining an interior passageway only slightly larger in diameter than the diameter of said drillhole, means forming a flow deflecting surface in said head for guiding said flow stream emanating from said drillhole through said passageway and out of said head without materially reducing the momentum of said coarse material, means engageable with the ground surface around said drillhole to form a substantial seal between said head and said ground surface, and means forming a substantial seal between said head and a drill stem extending through said head;
means for mounting said head on said drill rig;
means forming an enclosure disposed at a point removed from the immediate vicinity of said drillhole including a duct portion extending upward at an acute angle with respect to the axis of said passageway and in communication with said passageway, said means forming said enclosure including means for separating said coarse material from said fine material utilizing the inertia of said coarse material and the velocity of said flow stream, said means forming said enclosure defining a chamber for collecting said coarse material by at least partially utilizing gravitational forces acting on said coarse material as said coarse material enters said chamber;
means in communication with said chamber for separating and collecting substantially all of said fine material from said flow stream; and
suction producing pump means for maintaining the velocity of said flow stream emanating from said drillhole sufficient to carry substantially all of said coarse and fine material into said chamber utilizing the flow stream of air from said drillhole by operating said pump means to produce a static pressure condition in said chamber, said duct portion and said passageway less than atmospheric pressure.

53. A material conveying and lifting head adapted for use in connection with an earth drilling rig, said rig including a source of bailing air for evacuating drill cuttings from a drillhole by conducting bailing air from said source through a drill stem to the bottom of said drillhole, said head including:
a member forming an enclosure around said drill stem and said drillhole and defining generally cylindrical unrestricted passage means only sufficiently larger than the diameter of said drillhole so as to permit movement of said drill stem through said passage means and provide substantially unrestricted flow of bailing air from said drillhole and without permitting the deposit of drill cuttings on the surface around the periphery of said drillhole, said member including a flange adapted to be in substantially sealing engagement with the ground surface around said drillhole, said flange comprising a rigid annular plate projecting radially outwardly from said passage means in engagement with the ground surface around said drillhole for at least partially supporting said head with respect to the ground surface around said drillhole and for preventing enlargement of the mouth of said drillhole by the erosion of the ground surface at said mouth of said drillhole by a bailing air flow stream emanating from said drillhole.

54. The invention set forth in claim 53 together with:
flexible skirt means disposed around said flange and adapted to be in sealing engagement with the ground surface around said drillhole.

* * * * *